US006827965B1

(12) United States Patent
Fitzpatrick

(10) Patent No.: US 6,827,965 B1
(45) Date of Patent: Dec. 7, 2004

(54) FOOD PRODUCTS CONTAINING WHOLE CHIA SEED OR A GLUTEN-FREE AGGLUTINANT DERIVED THEREFROM AND METHODS OF MAKING SAME

(76) Inventor: Michael Fitzpatrick, 328 Fenimore Ave., Uniondale, NY (US) 11553

( * ) Notice: Subject to any disclaimer, the term of this patent is extended or adjusted under 35 U.S.C. 154(b) by 270 days.

(21) Appl. No.: 10/022,130

(22) Filed: Dec. 13, 2001

Related U.S. Application Data

(63) Continuation-in-part of application No. 09/745,924, filed on Dec. 23, 2000, now abandoned, which is a continuation-in-part of application No. 09/400,722, filed on Sep. 21, 1999, now abandoned, which is a continuation-in-part of application No. 09/009,826, filed on Jan. 20, 1998, now abandoned, which is a continuation-in-part of application No. 08/724,761, filed on Oct. 3, 1996, now abandoned, which is a continuation-in-part of application No. 08/523,050, filed on Sep. 1, 1995, now abandoned, which is a continuation-in-part of application No. 08/237,250, filed on May 4, 1994, now abandoned, which is a continuation-in-part of application No. 07/878,668, filed on May 5, 1992, now abandoned.

(51) Int. Cl.$^7$ .............................. A23L 1/05; A23L 1/212
(52) U.S. Cl. ........................ 426/615; 426/460; 426/507; 426/573; 426/629
(58) Field of Search ................................ 426/615, 629, 426/573, 507, 460

(56) References Cited

U.S. PATENT DOCUMENTS 3,879,188 A    4/1975  Fritz et al. ...................... 71/86
3,974,296 A *  8/1976  Burkwall, Jr. ............... 426/104
4,006,255 A *  2/1977  Gralak ......................... 426/72
4,784,867 A    11/1988 LaBaw et al. ............... 426/309
5,009,916 A    4/1991  Colliopoulos ............... 426/615

OTHER PUBLICATIONS

Elizabeth and Dr. Elton Baker, The UNcook Book, 1980, pp. 66, 72,104–113,118,154,165, Communication Creativity, Saguache, CO.
Steve Meyerowitz, "Sprout Bread", 1989, p. 21, The Sprout House, Great Barrington, MA.
Leslie and Suzannah Kenton, "Raw Energy", 1984, pp. 264–266, Warner Books, New York, NY.
Martha H. Oliver, "Add a Few Sprouts", 1975, pp. 63–64, Keats Publishing, New Canaan, Connecticut.
Kuei–Ying Lin; Daniel, J.R.; Whistler, R.L.; Carbohydrate Polymers, (1994) 23 (1) 13–18, 25 ref. ISSN: 0144–8617.
Richard Lucas, Common & uncommon uses of HERBS for HEALTHFUL LIVING, 1969, 39–41, Arco Publishing, Inc, New York, NY 10003.
Troller, J. and Christian, J., Water Activity and Food, Academic Press, p. 39–40, 79–80, 103–106, and 214.

\* cited by examiner

Primary Examiner—Helen Pratt

(57) ABSTRACT

Food products containing whole chia seeds or a gluten-free agglutinant derived therefrom are made by mixing a food material with water, adding whole chia seeds or an agglutinant derived therefrom in an agglutinating amount, and reducing the water activity of the mixture. Other ingredients such as honey, syrups, and sprouted grains can also be mixed with the chia seeds. The gluten free varieties are of especial value for those individuals who are allergic to the gluten in wheat and other grains.

20 Claims, 4 Drawing Sheets

FOOD PRODUCTS CONTAINING WHOLE CHIA SEED OR A GLUTEN-FREE AGGLUTINANT DERIVED THEREFROM AND METHODS OF MAKING SAME

1.0 RELATED APPLICATION

This application is a continuation-in-part of a previous application filed in the United States Patent and Trademark Office by Michael Fitzpatrick on Dec. 23, 2000, titled *"Food Products Containing Whole Chia Seed or a Gluten-free Agglutinant Derived Therefrom and Methods of Making Same"* and assigned Ser. No. 09/745,924, now abandoned, which was a continuation-in-part of a previous application filed in the United States Patent and Trademark Office by Michael Fitzpatrick on Sep. 21, 1999, titled *"Food Products Containing a Gluten-free Agglutinant Derived from Whole Chia Seed, and Methods of Making Same"* and assigned Ser. No. 09/400,722 (abandoned), which was a continuation-in-part of a previous application filed in the United States Patent and Trademark Office by Michael Fitzpatrick on Jan. 20, 1998, titled *"Food Products Containing a Gluten-free Agglutinant Derived from Whole Chia Seed, and Methods of Making Same"* and assigned Ser. No. 09/009,826 (abandoned), which was a continuation-in-part of a previous application filed in the United States Patent and Trademark Office by Michael Fitzpatrick on Oct. 3, 1996, titled *"Food Products Containing a Gluten-free Agglutinant, Derived from Whole Chia Seed, and Methods of Making Same"* and assigned Ser. No. 08/724,761 (abandoned), which was a continuation-in-part of a previous application filed in the United States Patent and Trademark Office by Michael Fitzpatrick on Sep. 1, 1995, titled *"Food Products Containing the Gluten-free Agglutinant, Whole Chia Seed, and Methods of Making Same"* and assigned Ser. No. 08/523,050 (abandoned), which was a continuation-in-part of U.S. application Ser. No. 08/237,250, filed May 4, 1994 and titled *"Food Products Containing the Gluten-free Agglutinant, Whole Chia Seed, and Methods of Making Same"* (abandoned), which was a continuation-in-part of U.S. application Ser. No. 07/878,668, filed May 5, 1992 and titled *"Food Products Containing the Gluten-free Agglutinant, Whole Chia Seed, and Methods of Making Same"* (abandoned).

2.0 TECHNICAL FIELD

The present invention relates in general to snack food products in which one of the ingredients is a gluten-free agglutinant, and more particularly to such snack food products in which that gluten-free agglutinant is nonpasteurized whole (i.e., not ground) chia seed or is derived therefrom. The invention further relates to methods of making such snack food products.

3.0 BACKGROUND ART

Before the invention of this patent application, most snack foods were held together by gluten, by the gluten in ground up gluten-containing grains, or by the agglutinating properties of sweeteners. Since some people are allergic or sensitive to gluten, and others have to restrict their use of sweeteners, they have hitherto been unable to enjoy many snack foods. Some raw sprouted snack foods were held together by the mucilaginous properties of ground flaxseed or ground chia seed.

In searching the background art for products in which a gluten-free mucilaginous seed such as chia seed, flaxseed, or psyllium is one of the ingredients, Applicant came up with the following:

On pages 265–266 of Raw Energy (Warner Books, Inc., 666 5$^{th}$ Ave., New York, N.Y., 1984), Kenton et al (Kenton) teaches a sprouted grain crisp (pg. 265). Kenton teaches that any kind of grain sprout (germinated grains) can be used to produce a cracker like food product/crisp product (pg. 265), as long as the sprouted grains are ground "as finely as possible in the food processor." Kenton teaches that the resultant product makes a great snack. Kenton takes the sprout product and thoroughly grinds the product in a food processor. After processing the sprouts into a dough, the dough can then be dried (pg. 266). In addition, Kenton teaches that additional ingredients such as honey, carob powder, and dried fruit can be added to food products. Although Kenton teaches that any grain can be used in the crisp product, Kenton is silent as to the specific grains, although Kenton does mention with respect to these products, that they must be ground as finely as possible, most likely, because unless they are ground as finely as possible, the products will not only not hold together well but also one might chip a tooth on the hard dried sprouts therein.

It should be mentioned, that although Kenton teaches a chia containing food product, the references noted above are silent as to the water activity of the product. On pages 103–104 of *Water Activity and Food* (Academic Press), Troller et al (Troller) teaches that it is essential to regulate the water activity of a food product to prevent microbial growth on the food product. By inhibiting microbial growth, one can prevent giving the consumer food poisoning. It also should be mentioned that although it might seem obvious to make a product such as Kenton's with whole chia seed rather than ground chia seed and with a sufficiently low water activity to prevent mold, without actually making this food product, it can not be known a priori whether the whole chia seeds in such a food product would be so hard as to break a tooth in the one consuming it.

On page 41 of *Common & uncommon uses of HERBS for HEALTHFUL LIVING* (Arco Publishing, Inc., 219 Park Avenue South, New York, N.Y.), Richard Lucas (Lucas) teaches:

"It is difficult for the body to assimilate any kind of seeds in their whole form. For this reason chia seeds are ground or soaked before using and can be added to the diet in a number of different ways. For example, a mucilaginous drink may be prepared by steeping a single teaspoonful of the seeds in a tumblerful of cold water for 12 hours (overnight). This beverage is ready for use by morning and may be sweetened with honey. From one to one-and-a-half teaspoons of the ground seeds may be sprinkled over salads or mixed with salad dressing; it can also be stirred into a bowl of soup into a cup of cottage cheese; a half teaspoonful can be added to scrambled eggs just before the eggs are removed from the skillet. As a spread, it may be mixed with margarine or butter. From one to one-and-a-half teaspoons of the ground seeds can be added to each cup of liquid used in pancakes or other batters. About two teaspoonfuls may be mixed with half a pint of yogurt. These are just a few examples. No doubt you will find many other ways in which you can fortify your diet with valuable, nutritive chia seeds."

Therefore, although Lucas teaches that it is desirable to add chia seeds to a food product, he emphasizes that the seeds must be ground or soaked before adding, and that if soaked, that they be so used while still soaking in the soak liquid. Lucas teaches that ground chia seeds can be used in a variety of products including pancakes. Lucas teaches that the ground chia seeds can be added from one to one-and-a-half teaspoons to a cup of liquid used to make a batter. The batter can be then be cooked into pancakes or other batters. Although Lucas teaches that chia seeds naturally contain hydrocolloid like and mucilaginous properties, one would not expect that whole chia seeds would aid in the adherence of food products, this never having been tried before. Only ground chia seeds were previously known to aid in the adherence of food products. It further should be noted that a glass of water in which chia seeds have been soaking overnight has a water activity over 0.90, and would not be considered a convenient snack food which one could carry in one's pocket or backpack.

In the first sentence of the above quote, Lucas actually teaches away from the use of whole chia seeds in food products, the sole exception being a drink in which the chia seeds have been soaked for 12 hours. Since no one before the Applicant had ever made a dry food product containing whole chia seeds, it could not be known a priori whether such a food product would be edible, or would break one's teeth due to having whole dried chia seeds. Since never before had a dry food product contained whole unground chia seed, it could not be known a priori whether such a food would hold together well, or would shatter into a thousand pieces at the slightest touch. Even if it were known that foods containing ground chia would be held together by the agglutinative properties of ground chia, one would not be able to logically extrapolate to the agglutinative properties of whole nonground chia seeds. Until one actually makes a dry food product containing whole unground chia seeds and examines its properties, one cannot a priori state what those properties might be. I, for example, sincerely believed, based upon previous experience with and research on chia seeds, that if a dry product were produced in which whole chia seeds were the only ingredient, it would be so fragile that it would crumble at the slightest touch.

On pages 72 and 73 of *The UNcook Book* by Elizabeth and Dr. Elton Baker (Drelwood Publications 1980, Distributed by Communication Creativity, Saguache, Colo. 81149), the suggested uses for chia seed sprouts are "soups, dips, spreads". The recipe for rolled tacos on page 105 lists flaxseed meal or chia seed meal as one of the ingredients and mentions that a rather stiff paste can be formed from the ingredients.

Just before the recipe for Wheat Crackers on page 111, the following statement appears: "All crackers can be made without flaxseed meal. However, for a crisper, noncrumbling cracker, add 2 or 3 tablespoons of flaxseed meal and a few teaspoons of water to the dough." The recipe for Wheat Crackers is then given as follows:

| Ingredients | Method |
| --- | --- |
| 2 cups wheat berries<br>1 teaspoon salt (optional)<br>Soak water* or plain water<br>Sprout wheat berries for 24 hours (yields approx. 4 cups sprouted wheat).<br>*Soak water is the water in which grain has been soaked prior to sprouting it. It is reputed to contain minerals and enzymes. | Grind fine (4 cups sprouted wheat), work into a dough, with or without salt, and then add soak water or plain water to make a very thick cream. (This can be made in a blender.) Cover a large cookie sheet with wax paper, or cellophane, and spread dough over all. Dehydrate at 100 F. (38 C.) in a dehydrator or in a preheated, turned-off oven. Mark in squares when half dry. When crisp, break into squares and store in a |

-continued

| Ingredients | Method |
| --- | --- |
| | sealed container in a cool, dry place. Wheat crackers are more sturdy because of the gluten in the grain. |

Then on p. 112, the recipe for Rye Crackers is given as follows: "Use the same recipe as for Wheat Crackers, but use sprouted rye and add ½ cup chia or flaxseed meal and ½ cup water. (The seed meal keeps the crackers from crumbling.)"

Also on p. 112, the recipe for Rice Crackers is given as follows: "Use the same recipe as for Wheat Crackers, substituting sprouted rice for sprouted wheat and add ½ cup chia seed and ½ cup water."

The full recipe for Rice Crackers would therefore be:

| Ingredients | Method |
| --- | --- |
| 2 cups rice<br>1 teaspoon salt (optional)<br>½ cup chia and ½ cup water<br>Soak water or plain water<br>Sprout rice for 24 hours | Put the sprouted rice, the chia, and ½ cup of water into the bowl of a food processor with or without the added salt. Grind fine, and work into a dough. Then add soak water or plain water to make a very thick cream. (This can be made in a blender.) Cover a large cookie sheet with wax paper, or cellophane, and spread dough over all. Dehydrate at 100 F. (38 C.) in a dehydrator or in a preheated turned-off oven. Mark in squares when half dry. When crisp, break into squares and store in a sealed container in a cool, dry place. |

The recipes for Oat Crackers and Barley Crackers also on page 112 list flaxseed and chia seed meal as optional ingredients and mention that when these are used, a sturdier, richer cracker results.

In the recipe for seed butter on page 118, the ingredients are given as "1 cup seeds ground to fine meal", and "4 to 6 tablespoons water (sunflower and pumpkin take less water, sesame more, flaxseed the most)". The instructions given are: "Mix meal and water, adding liquid until desired thickness. Flaxseed butter will thicken much in a few minutes. We season flaxseed and sesame butters with soaked and drained celery seed, caraway, or dill, for instance." On page 154, chia seed yogurt is mentioned as a variation of flaxseed yogurt.

The cracker recipes involving either flaxseed or chia seed all call for the ingredients to be ground in a food processor. When this is done, the resultant batter will not keep for more than a few hours before it starts to sour. And since all the above cracker recipes call for the batter to be spread on cookie sheets, the batter will dry unevenly—quickly at the surface which is exposed to air and more slowly on the bottom where the batter comes in contact with the cookie pan. This is undesirable as it not only causes the top surface of the batter to have a different appearance and color than the bottom surface of the batter and, most likely, contributes to the large cracks which form in the batter as it dries, but it also greatly slows drying time with a resultant increase in bacterial souring. Further the dried batter tends to stick to the cookie sheet making removal of the batter difficult.

Thus, although, Baker teaches that chia seeds and water can be added to the cracker in order to strengthen the cracker (The UNcook Book, pg. 112), Baker emphasizes that it is chia seed meal which should be used, not whole chia seed. It should be emphasized that although one might be fully knowledgeable about the characteristics of ground chia seed, one would not be able to extrapolate as to whether and how whole chia seed could be used without actually trying it and noticing the results.

Since none of the methods for the above products utilizes whole chia seed in the batter to be dehydrated, it would not be known from those methods whether whole chia seed or an agglutinant derived therefrom could be used as an agglutinant to hold products together. Further, it also would not be known that a batter in which whole chia seed was the agglutinant could be prepared in such a way that the batter, when spread on dehydrator screens, would not leak through and thus could be dried on both sides simultaneously, thus not only greatly speeding up the drying process but also greatly increasing the product yield from each dehydrator tray. Further, when the above products which utilize chia seed meal are dehydrated, the ground up chia seed tends to sour due to the long time that lactic acid bacteria act on the moist ground up chia seed before the water activity of the batter is reduced below 0.60. (Bacterial activity will no longer take place when the water activity of the product falls below 0.60.) The term "water activity" ($a_w$) is used throughout this specification and in the appended claims in its usual context to mean the ratio of the fugacity of water in the system being studied (f) to the fugacity of pure water ($f_0$) at the same temperature. Hence, the water activity of pure water is 1.00. The water activity of the products and compositions herein can be measured using well-known physical chemical techniques and commercially available instruments.)

It should also be noted here that the methods presented by Baker do not recognize the differences in the absorbent properties of flax-seed and chia seed. As it turns out they are not even close equivalents in their water absorption capabilities. Applicant ran experiments to determine the water absorption capability of flax-seed, chia seed, and psyllium (which like flaxseed and chia seed also has a mucilaginous seed coat). Summarizing the experiments, one ounce of flaxseed absorbed 2.1 ounces of water; one ounce of psyllium absorbed 11.8 ounces of water; and one ounce of chia seed absorbed 12.0 ounces of water. (It should be mentioned that chia seeds from a later purchased bag of chia were found to absorb about 16 ounces of water per ounce of chia seeds.) It is seen then that chia seed is nearly 6 times as efficient in absorbing water as flax-seed. Some crackers were made with whole psyllium but these were difficult to chew, the seed coat of psyllium not only being very hard but also indigestible as well. In addition, some people are extremely allergic to psyllium seed. Similarly crackers made with whole flax-seed were difficult to chew due to the hard seed coat and the much larger size of the flax seed. (Chia seed, by comparison, is a very small seed and has a very soft seed coat.) In addition, crackers made with whole flaxseed do not hold together well.

The background art teaches various methods of making crackers from sprouted gluten-containing grains and seeds. Perhaps the earliest method and one which is representative of all those later methods which utilize the gluten in gluten-containing grains to hold products together is found in the third century manuscript *The Essene Gospel of Peace* which was translated into English in 1928 by Edmond Bordeaux Szekely (International Biogenic Society, B.C., Canada (1981)). The method for making raw sprouted crackers taught by this manuscript (pages 40–41 of the English translation) is as follows:

(1) Sprout wheat for about 12 hours.
(2) Crush the sprouted wheat to paste consistency.
(3) Make thin wafers out of this sprout paste.
(4) Set these wafers in the sun to dry.

There are a number of disadvantages to this method:

1. Unless a cracker has significant gluten, it will not hold together. Unfortunately some people are allergic to gluten which prevents them from enjoying raw sprouted grain crackers. In addition, gluten is a notoriously difficult protein for many people to digest. Although honey can be used as a type of an agglutinant, excessive honey is not conducive to good health.

2. When a gluten-containing sprouted grain is used as the agglutinant, it is necessary to first grind the sprouted grain in a food processor in order to make the gluten in the grain available for agglutinating purposes. The nutrients in the grain which were shielded from oxidation by the seed coat of the grain, are thus now exposed to oxidation when the grain is ground causing the loss of some of those nutrients. Further, a considerable amount of electrical energy is expended in grinding the grain. And, if one is not careful, the grain will overheat as it is being ground leading to the destruction of some of its heat sensitive nutrients.

3. Further, when these sprouted grains are ground into a paste, and this paste is formed into wafers, these wafers are now subject to the action of lactic acid bacteria. While these wafers are drying, the bacteria which were on the surface of the wheat sprouts are now in the raw sprout paste, fermenting it and imparting a sour taste to it. The pH drop due to lactic acid souring, $\delta pH_{LA}$, for crackers made from this sprout paste, determined as outlined in §4.1, is about 1.4. This 1.4 pH drop is due to lactic acid formation in the sprout paste as it dried. Furthermore, due to the thinness of the batter, large drying surfaces are required to produce an appreciable amount of these sprout wafers. (Due to its high gluten content, the resultant crackers are very hard and tend to cut up the inside of one's mouth as they are chewed due to their sharp, hard edges. If, on the other hand, the drying is stopped before the water activity of the crackers drops below 0.60 in order to yield softer crackers, they have a tendency to mold, and their shelf life is only about a week in the refrigerator.)

Applicant formerly included a large percentage of wheat sprouts in the crackers he made, because wheat is high in gluten, and crackers made with wheat sprouts as a major ingredient hold together well. Applicant, however, noticed that when these crackers were fully dehydrated, they were very hard, and one had to use extreme care when eating them to avoid cutting up the inside of one's mouth. Consequently, Applicant began including whole hulled sesame seed which is a relatively soft seed in his cracker batter. Not only is sesame seed a relatively soft seed but also the sesame seed dilutes the gluten-containing wheat. As a result the resultant crackers crumble more easily, are somewhat softer, and are less likely to cut up the inside of one's mouth when they are being eaten. In his search for other soft seeds besides sesame seed which he might incorporate in his crackers, Applicant experimented with hulled sunflower seeds, caraway seeds, fennel seeds, and chia seeds, each of which is relatively soft and has a mild taste.

In order to properly discuss Applicant's early experimental use of whole chia seed in food products, it is first necessary to introduce the terms Whole Chia Seed Fraction of Agglutinants, CFA, and Majority Agglutinant Amount, MAA. If C is the weight of whole chia seed in a given amount of a food product and GCI is the weight of gluten-containing ingredients in the product, then the Whole Chia Seed Fraction of Agglutinants, CFA, is C/(C+GCI). Essentially CFA is a measure of the portion of the burden of agglutinating the food product which is being borne by the whole chia seed in the food product. If CFA=1, the entire burden of agglutinating a product is being borne by the whole chia seed in the food product. If, however, CFA=0.50, the agglutinative burden is equally borne by the whole chia seed and by the gluten-containing ingredients in the food product. And if CFA=0, the entire burden of agglutinating the food product is being borne by the gluten-containing ingredients in the food product. As will be shown, none of Applicant's early products with whole chia seed had a CFA higher than 0.5. Since none of the other background art products uses whole chia seed as an agglutinant to hold a food product together, the CFA of all the other background art products, is, by definition of CFA, 0. Similarly, a Majority Agglutinant Amount of chia seed is an amount of whole chia seed in excess of GCI. When whole chia seed is added to an aqueous mixture of other ingredients in a Majority Agglutinant Amount, more than half of the burden of agglutination will be borne by the whole chia seed and less than half the burden of agglutination will be borne by any gluten-containing ingredients present in the aqueous mixture.

One day Applicant planned to make a cracker which would consist of one part by weight wheat sprouts, one part by weight sesame seed, one part by weight chia seed, one tenth part by weight kelp powder, one twentieth part by weight spirulina powder (which has a bright green color), and one-twentieth part by weight enzyme powder. Using the above formula for CFA, the Whole Chia Seed Fraction of Agglutinants, CFA=0.50. By the time of the making of these crackers, the evolution of the methods used to make his sprouted grain crackers had progressed to the point where Applicant would customarily prepare an aqueous slurry from the milled wheat sprouts and all the other ingredients except for the sesame seed. This slurry was very thin which enabled the various ingredients to be very thoroughly mixed together. Now that the wheat sprouts and other ingredients had been thoroughly mixed together, Applicant would stir in whole hulled sesame seed, making a somewhat thicker but still quite thin slurry which he would then pour on dehydrator solid sheets in order to dehydrate it. Therefore on this occasion, Applicant prepared a slurry from wheat sprouts, spirulina powder, and kelp powder and then poured in whole chia seed. Unexpectedly, the mixture became so thick that Applicant was unable to add any sesame seed at all. Further, the chia seed conglomerated and solidified into many large clumps in the batter which frustrated any attempt to evenly disperse the chia seed throughout the batter. Consequently Applicant also had great difficulty spreading the batter on the dehydrator solid sheets. (While, perhaps, this mixture may have been thick enough to have been spread on dehydrator screens, that thought did not occur to Applicant.) As the mixture on the dehydrator sheets dried, it developed large and deep unsightly cracks all over its surface, and numerous clumps of chia seed could be seen in the final product. (At the time, Applicant believed that the reason for these large cracks in the batter was that in the regions of the cracks there was an abundance of chia seed and it was not holding together at all.) And, due to the use of the bright green spirulina powder in the cracker batter, the crackers turned a very unappealing green color.

The crackers were so unappealing due to the unsightly cracks, the clumps of chia therein, and the green color that Applicant only offered them for sale to two of his close friends, one of whom stated that he would even eat sand if he thought it was good for him, and the other who was legally blind. Due to the unappetizing appearance and unfavorable organoleptic properties (due to the clumps of chia therein) of these crackers, Applicant regretted his large recent purchase of chia seed, and included only small amounts of chia seed in succeeding batches of crackers in order to avoid ruining them (while he used up the remaining chia seed). (Succeeding batches of crackers had at least a 4 to 1 ratio of gluten containing sprouts to chia seed. The CFA for succeeding batches of these early crackers ranged from 0.08 to 0.20.) When his supply of chia seed was used up, Applicant planned to never again incorporate chia seed in any of his crackers. (It should be mentioned here that even if these crackers had not developed large unsightly cracks, Applicant nevertheless still would have believed that the crackers were being held together solely by the gluten in the milled wheat sprouts, and not by the as-yet-unknown agglutinating properties of whole slightly germinated chia seed.)

Another way of looking at Applicant's early experimental use of whole chia seed in crackers, is that each batch of crackers made at that time had a sufficient quantity of gluten-containing ingredients so that when these gluten-containing ingredients were ground up, the gluten contained therein was sufficient to bind together or agglutinate the crackers made therefrom. In other words, each of these early food products which contained whole chia seed had sufficient gluten-containing ingredients to agglutinate the products.

Thus, the background art does not show any food products containing whole (not ground or milled) chia seed which are firm to the touch, and are characterized by being substantially dry to the touch when touched, whereby the food product makes a convenient snack food which can be carried in one's pocket for example.

With the exception of Applicant's early experimental use of whole chia seed in crackers, none of the above methods for making chia seed-containing products produce a batter which contains whole chia seed; on the contrary they all have either ground chia seed or chia seed meal in the batter to be dehydrated. And in none of the above methods (including Applicant's early experimental use of whole chia seed) is there a recognition that whole chia seed (or an agglutinant derived therefrom) in the absence of gluten-containing grains can be used to bind a product together such that it can be used as a convenient snack food. Further, chia seed has a mild but somewhat unusual taste which some people find objectionable. In none of the above methods (including Applicant's early experimental use of whole chia seed) is there disclosed a method which effectively masks the mild taste of the chia seed. This is important because it has been found that sweeteners alone will not mask the mild but slightly unusual taste of the chia seed. For a truly acceptable product, the taste of the chia seed should be masked so that it can not be detected. Further, none of the above methods teaches one how dehydrator screens could be used instead of dehydrator sheets which would greatly facilitate drying—the upper and lower sides of the batter could then dry simultaneously, thus greatly speeding up the drying process and reducing souring at the batter's lower surface.

Since the above background art methods do not teach one how to prepare a batter which could be spread on dehydrator screens, the commercial utility of these methods is severely limited by the bacterial souring which occurs, the unsightly cracks which develop in the batter, and the small yields of product obtained. Further, since in all of the above methods (with the exception of Applicant's experimental usage of whole chia seed), either chia seed meal is used or the whole chia seed is ground along with other ingredients in a food processor, significant exposure of the interior nutrients of these ingredients to oxidation will take place, resulting in the destruction of some of these nutrients.

4.0 SUMMARY OF THE INVENTION, OBJECTS, AND ADVANTAGES

NOTE: Throughout the Specification and the claims which Follow, the Words "Seed" and "Seeds" are Interchangeably used for the Plural of the Word "Seed".

4.1 SUMMARY OF INVENTION

The ideal agglutinant for making crackers (especially nonpasteurized crackers) would be one which a. does not need to be ground to be easily chewed, grinding not only involving extra time and expense but also exposing the interior nutrients to the deleterious effects of oxidation;
b. does not need to be cooked to be easily chewed. Cooking not only involves extra time and expense but also damages or destroys many of the precious heat labile ingredients of the agglutinant;
c. would not be subject to the souring action of lactic acid bacteria;
d. does not contain gluten to which many people are sensitive, yet contributes to holding the cracker together so as to make it a convenient snack food;
e. makes possible the production of large quantities of crackers, by permitting a greatly increased yield from each dehydrator tray.
f. can be stirred into a thin easy-to-stir slurry of the other ingredients, and will then quickly thicken the resultant batter to such an extent that this batter can now be spread very thickly upon dehydrator screens (instead of on solid sheets) without significant leakage through the dehydrator screens. Hence the other ingredients can first be thoroughly mixed together with sufficient water that this mixing operation consumes a minimum of energy. Cracker's made by the methods of this invention rely heavily on this most unusual property of chia seed-after all other ingredients have been thoroughly stirred together in a fairly thin easy-to-stir slurry, whole chia seed is added to quickly thicken the batter to such an extent that it can now be spread on dehydrator screens rather than on dehydrator solid sheets, thus resulting in large quantities of a nutritious product with large energy savings. (Suitable screen material would have a hole size of about 0.12 inches by 0.14 inches, and a strand thickness of about 0.05 inches. The screen material provides a perforated surface which gives drying air access to the lower drying surface of the cracker batter.) The type of drying surface provided by a supported screen, mesh, perforated surface or other functionally equivalent surface which gives drying air access to both the upper and lower surfaces of the drying batter simultaneously shall be called a "double-access drying surface". The upper surface of the double-access drying surface which contacts the lower surface of the drying batter shall be referred to as "the upper surface of the double-access drying surface".
g. is at least slightly germinated. By slightly germinated, it is meant that the seed, after imbibing some of the liquid in which it is placed, is dehydrated slowly at a low temperature, thus giving the seed enough time to germinate to a small extent. This leads to a slight increase in enzymatic activity within the seed and a slight decrease in enzyme inhibitors.
h. is characterized by having a taste which can easily be masked by the addition of a suitable additive.
i. is characterized by its use resulting in a food product which is firm to the touch, and substantially dry and non-gooey when so touched, so that the resultant food product makes a convenient snack food. If the food product is touched with one's finger, it will not cling to one's finger, and if it is picked up between two fingers, it will not fracture.

As it turns out, the proper proportion of whole chia seed in the batter with respect to the other ingredients and with respect to the water in the batter solves all of the problems with the background art products and has all the properties of the ideal agglutinant mentioned above.

Furthermore, an agglutinant which Applicant extracted from chia seed, although it does not have all the properties above, does have properties a through d and h. Thus an agglutinant derived from chia seeds is ideal for making raw sprouted grain crackers when it is not desired to have chia seed as one of the ingredients.

To overcome the disadvantages found in the background art methods, Applicant presents as his invention a new class of food products which is prepared with the nonsouring gluten-free agglutinant, slightly germinated whole chia seed or an agglutinant derived therefrom. When using chia seeds instead of the agglutinant derived therefrom, the chia seeds should preferably be nonpasteurized in order to spare the many heat sensitive nutrients of the chia seeds. With the advent of this invention, not only can food products be prepared with a CFA in excess of 0.50, but with CFA's which range as high as 1.00. Specifically, Applicant claims as his invention a new class of food products with CFA's in excess of 0.6. Hence each product having whole chia seed as one of its ingredients in this new class of food products is prepared with an amount of chia seed which is in excess of (0.6/0.4)*GCI and thus, at least 1.5*MAA. Each of the food products disclosed in this application which have whole chia seed as one of the ingredients has a CFA in excess of 0.6. None of the background art products, nor even any product resulting from Applicant's early use of chia seed, had a CFA higher than 0.5.

The preferred embodiments of this new class of food products are low in gluten-containing ingredients. The bulk of the agglutinative burden is borne by the whole chia seeds, or an agglutinant derived therefrom, in these products and only a small part of the burden is borne by any gluten-containing ingredients therein. In other words the preferred embodiments of this new class of food products are absent sufficient gluten-containing ingredients to agglutinate the products. Another way of saying this is that the preferred embodiments of this new class of food products have insufficient gluten-containing ingredients to agglutinate the products. Needless to say, the most preferred embodiments are entirely gluten-free, the whole burden of agglutinating the food products being borne by the whole chia seed or the derived chia seed agglutinant contained therein.

One of the major products in this invention is a cracker that has the organoleptic properties of figs. This cracker consists of chia seed, a sweet syrup, and carob powder. Throughout the remainder of this specification, the term sweet syrup shall be used for the group of syrups consisting of honey, fruit syrups, grain syrups, tree syrups, and molasses. When crackers are prepared with chia seed and the syrup alone, the mild but somewhat unusual taste of the chia seed can be detected. But with the use of a suitable amount of carob powder, the taste of the chia seed is completely masked, and the product tastes like and has the organoleptic properties of dried figs: sweet, chewy, and slightly crunchy. Due to their strong and pleasant taste, the following may be used in addition to or in place of carob powder in these products to mask the taste of the chia seed therein: chocolate, cocoa, roasted chicory, and coffee. In none of the products of the background art (including Applicant's early experimental use of whole chia seed) is there a recognition that when carob powder is included in the product in a suitable amount, the carob powder effectively masks the mild taste of the chia seed. This is important because syrups alone do not mask the mild but slightly unusual taste of the chia seed. But with the use of a sufficient amount of carob powder, the taste of the chia seed can not be detected.

The chia seeds in these products are preferably uncooked; i.e. they are not subjected to such times and temperatures which would denature the proteins thereof. Further, the chia seeds in these products are preferably nonpasteurized. According to the fourth edition of *Food Microbiology* by Frazier and Westhoff (McGraw-Hill Book Company, 1988), "Pasteurization is a heat treatment that kills part but not all of the microorganisms present and usually involves the application of temperatures below 100 C. . . . Times and temperatures used in the pasteurizing process depend on the method employed and the product treated. The high-temperature-short-time (HTST) method employs a comparatively high temperature for a short time, whereas the low-temperature-long-time, or holding (LTH), method uses a lower temperature for a longer time. Some examples follow of pasteurizing treatments given various types of foods. The minimal heat treatment of market milk is at 62.8 C. for 30 minutes in the holding method; at 71.7 C. for at least 15 seconds in the HTST method; and at 137.8 C. for at least 2 seconds in the ultrapasteurized method . . . . Dried fruits usually are pasteurized in the package at 65.6 to 85 C. for 30 to 90 minutes, the treatment varying with the kind of fruit and the size of the package." (pages 24–25) All of these pasteurization methods destroy most of a food's enzyme activity. In fact, according to page 98 of the fourth edition of *Food Microbiology*, the bovine phosphatase enzyme is monitored in the pasteurization of milk. Detection of this enzyme in processed milk indicates that the milk was not properly pasteurized. When it is stated that the products of this invention are nonpasteurized, what is meant is that they were not subjected to such temperatures and durations of time which would be required to destroy most of the bacterial and fungal activity which ordinarily takes place in sprouts when their seed coats are broken. Such temperatures and times also destroy most of the enzyme activity as well. Further, these products are never heated to a temperature higher than 104° F. (40° C.), a temperature well below that required to destroy any of the known nutrients in seed sprouts.

Finally although slightly germinated whole chia seed, the agglutinant in these products, is raw, it is not soured. The drop in pH value of the chia seed in these food products during product preparation due to lactic acid bacterial souring is less than about 0.2. The sour taste which is found in raw sprouted gluten-containing grain products whose sprouted grains have been ground, is due to the excessive action of lactic acid bacteria on the moist exposed interior portion of the sprouted grain before dehydration was complete. As the lactic acid bacteria ferment the sugars of the sprouts in these products to lactic acid, the acid buildup in the product lowers the pH of the product thus resulting in the sour taste. Such products typically experience a drop in pH from about 6.0 to less than 5.0 during product preparation. Hence, for such products, $\delta pH_{LA}$, the drop in pH due to lactic acid souring during product preparation, is greater than 1.0. (The LA in $\delta pH_{LA}$ stands for Lactic Acid.)

$\delta pH_{LA}$, the pH drop in any product due to lactic acid bacteria converting the sugars of the product to lactic acid during the preparation process can be determined as follows:
1. The cracker batter can be considered as consisting of a certain percentage by weight water and 100 minus that percentage by weight, solids. Based upon the percentages of the various ingredients used, the amount of water which each ingredient contains, and the amount of any additional water added to the batter, calculate the weight percentage of the batter that is water and the weight percentage that is solids. Applicant has determined the weight percentage of water in the following ingredients:

| Batter Ingredient | Weight Percentage Water |
|---|---|
| 18 hour sprouted wheat | 47.0 |
| Sage Honey | 12.0 |
| Wild Desert Honey | 12.0 |
| Maple Syrup | 31.5 |
| Barley Malt | 16.5 |
| Rice Syrup | 15.0 |
| Molasses | 19.5 |
| Bernard Jensen's Grape Concentrate | 36.0 |
| Dehydrated Wheat Sprouts | <3 |
| Sesame Seeds | <3 |
| Chia Seed | <3 |

Thus, for example, with respect to the 18 hour sprouted wheat, one ounce of wheat sprouts can be considered as consisting of 0.47 ounces of water and 0.53 ounces of wheat sprout solids.

2. Using the above percentages, take 1 ounce of the batter from which the product is to be made, and add sufficient distilled water to make a slurry which is six parts water and one part solids (hereinafter called a 6:1 slurry). For example, if it is determined that the one ounce of batter is "w" percent water, and therefore "100-w" percent solids, it is necessary to add $[6(100-w)-w]/100=(6-0.07w)$ ounces of distilled water to the one ounce of batter to form a 6:1 slurry.
3. Measure the pH of this slurry. Call it $pH_o$.
4. Dehydrate the batter to a water activity of 0.40.
5. Mill 1 ounce of the final product to flour, and stir it into 6 ounces of distilled water to form a 6:1 slurry.
6. Measure the pH of this 6:1 slurry. Call it $pH_f$.
7. Then $\delta pH_{LA}=pH_o-pH_f$, and is, therefore, a positive number which reflects the pH drop due to lactic acid formation in the product.

As used throughout this specification, the term "6:1 slurry" refers to a slurry consisting of six parts distilled water and 1 part the solids of the batter or the product made from the batter. In the case of a 6:1 slurry made from a batter, the water inherent in the batter plus added water would be six times the weight of the solids in the batter. In the case of a product made by dehydrating the batter, the product is considered as having no inherent water, and the water which is added is six times the weight of the portion of the product from which the slurry is to be made.

In the remainder of this specification, the pH value of a product containing chia seed shall be defined as the pH value of a 6:1 slurry prepared from that product. Similarly the pH value of a batter from which the product is to be made shall be defined as the pH value of a slurry consisting of six parts water and 1 part the solids of that batter (i.e., enough water is to be added to the batter so that the water inherent in the batter plus added water would be six times the weight of the solids in the batter).

In each of the Examples of §5.7, the value of $pH_f$ is an actual measured value. Unless indicated otherwise, the value of $pH_o$ is an estimated value based on Applicant's previous work with these materials. Such estimated values will be reasonably close to actual measured values inasmuch as the pH of unsoured seeds and unsoured sprouted grains ranges from about 6.0 to about 6.5, depending on the type of seed or grain.

According to page 388 of the 4 th edition of *Food Microbiology* (McGraw Hill Book Company, 1988), "A simplified equation for the production of lactic acid from glucose by such organisms (as lactic acid bacteria) is:

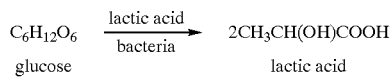

$$C_6H_{12}O_6 \xrightarrow[\text{bacteria}]{\text{lactic acid}} 2CH_3CH(OH)COOH$$
glucose → lactic acid Actually a series of steps is involved, and small amounts of other products are produced."

According to the article on "Human Sensory Reception" on page 552 of Volume 16 of *The New Encyclopaedia Britannica* (Encyclopaedia Britannica, Inc., 15th Edition, 1982), "No simple relation has been found between chemical composition of stimuli and the quality of gustatory experience except in the case of acids . . . . The hydrogen ions of acids (e.g., hydrochloric acid, HCl) are largely responsible for the sour taste; but although a stimulus grows more sour as its hydrogen ion ($H^+$) concentration increases, this factor alone does not determine sourness. Weak organic acids (e.g., the acetic acid in vinegar) taste more sour than would be predicted from their hydrogen ion concentration alone; apparently the rest of the acid molecule affects the efficiency with which the hydrogen ions stimulate." This explains why raw sprouted grain crackers in which sufficient lactic acid souring has occurred to lower the pH of the crackers to 4.6 taste much more sour than honey which has a pH of about 4.0 and grape concentrate with a pH of 2.4. The lactic acid molecule stimulates those taste receptors in our taste buds which are sensitive to sour and bitter much more vigorously than do the acidic molecules in honey and grape concentrate.

Therefore, by measuring pH at various stages of the production process, it can be demonstrated that bacterial souring has not occurred in the slightly germinated whole chia seed. As will be shown, those varieties of chia seed crackers prepared without ground grains experience a pH drop of less than about 0.2 during the course of processing.

In order to better illustrate the product and the methods that Applicant claims as his invention, Applicant will show below a side by side comparison of Applicant's method and Baker's method for producing Rice Crackers, the closest known background art.

First, Applicant weighed and recorded the weights of each of the ingredients listed in Baker's above recipe for Rice Crackers, so that this recipe could be exactly duplicated at any time. Applicant did not use the optional 1 teaspoon of salt. (Highly health conscious people favor a salt-free diet.) The above recipe then becomes:

| Ingredients | Method |
|---|---|
| 2 cups rice (weighs 14 ounces)<br>½ cup chia (weighs 3.2 ounces)<br>½ cup water (weighs 4.0 ounces)<br>Soak water or plain water (Applicant used 8 oz. of distilled water)<br>Sprout rice for 24 hours | Put the sprouted rice, the chia, and ½ cup of water into the bowl of a food processor. Grind fine, and work into a dough. Then add soak water or plain water to make a very thick cream. (This can be made in a blender.) Cover a large cookie sheet with wax paper, or cellophane, and spread dough over all. Dehydrate at 100° F. in a dehydrator or in a preheated, turned-off oven. Mark in squares when half dry. When crisp, break into squares and store in a sealed container in a cool, dry place. |

When Applicant followed the above recipe, his food processor had difficulty grinding the mixture of rice sprouts, chia seed, and water due to the lack of sufficient water in the mix, the ground chia seed very quickly absorbing the available water. The resultant batter developed large cracks during dehydration and consequently had an unacceptable appearance. Therefore, Applicant modified the above recipe to utilize 8 ounces instead of 4 ounces of water in the mixture of rice sprouts, chia seed and water. Applicant's food processor was able to grind this modified mixture much better and much more thoroughly than the mixture resulting from the unmodified recipe. Applicant then reground the resultant batter with 4 additional ounces of water to make a very thick cream. Applicant estimates that $pH_o$, the pH value of a 6:1 slurry made from this batter would be about 6.0. When the resultant batter was dehydrated, it still developed large cracks, but had a more acceptable appearance than previously. $pH_f$, the pH value of a 6:1 slurry made from the dehydrated product was 4.66. Hence $\delta pH_{LA}$, the pH drop due to lactic acid souring is estimated to be 6.0–4.66=1.34. Applicant believes the cracks developed due to the fact that rice does not contain gluten, and the amount of chia seed used (3.2 oz.) is insufficient to bind together the 14 ounces of ground rice sprouts. Another contributing factor to the size of the cracks is that the batter, due to its low viscosity, must be dehydrated on dehydrator sheets which leads to rapid drying at the surface and slower drying where the batter contacts the dehydrator sheet, causing severe strains in the drying batter.

With these modifications and a filling in of details, on the next page is shown a side by side comparison of Baker's and Applicant's methods for making rice crackers:

| Rice Crackers (Baker's Method) | Rice Crackers (Applicant's Method) |
|---|---|
| 1A. Sprout 2 cups (= 14 oz.) of organic brown rice for 24 hours. | 1B. Sprout 14 oz. of organic brown rice for 24 hours. |
| 2A. Measure out ½ cup (= 3.2 oz.) of chia seed. | 2B. Dehydrate the sprouted rice at a temperature of 100 F. (38 C.) until dry. The resultant dried rice sprouts should weigh about 12.5 oz. |
| 3A. Mix well the rice sprouts, the chia seed, and 1 cup (= 8 oz.) of distilled water. | |
| 4A. Grind fine the mixture of step 3A (approximately 10 minutes). | 3B. Mill the dried rice sprouts to flour. |
| 5A. Add 4 oz. of distilled water to the mixture of step 4A, and blend well (approximately 10 minutes). (Working the | 4B. Measure out an amount of chia seed which weighs the same as the dried rice sprout flour of step 3B. |

-continued

| Rice Crackers (Baker's Method) | Rice Crackers (Applicant's Method) |
|---|---|
| batter into a dough does not accomplish anything inasmuch as neither rice nor chia seed contains gluten.) | 5B. Pour an amount of 104° F. (40° C.) water which weighs 3.6 times the weight of the dried rice sprout flour of step 3B (approximately 45 oz.) into the pail to be used for mixing the batter. |
| 6A. Remove 2 oz. of batter. Determine $pH_O$, the pH value of a 6:1 slurry of this batter. | |
| 7A. Put a dehydrator circular solid sheet in a dehydrator tray. | 6B. Pour milled rice sprouts into pail and stir well. |
| 8A. Pour all the batter of step 5A (weighing approximately 2 lbs.) onto the dehydrator solid sheet, and spread batter evenly around on dehydrator circular solid sheet. | 7B. While stirring vigorously, slowly pour chia seed into pail, and continue to stir vigorously for 5 minutes. |
| | 8B. Remove 2 oz. of batter. Determine $pH_O$, the pH value of a 6:1 slurry of this batter. |
| 9A. Place the dehydrator tray containing the solid sheet with its batter on the dehydrator base unit. Place the insulated dehydrator cover on top of the top tray, and set dehydrator temperature to 100 F. (37.8 C.) | 9B. Let batter in pail set for about 2 minutes before proceeding. |
| | 10B. Place a dehydrator circular screen on a smooth clean hard surface. |
| 10A. 30 minutes after step 9A, slice the drying batter into 2 inch squares. | 11B. Spread evenly around on the dehydrator circular screen all 4 lbs. 6 oz. of batter from the pail. |
| 11A. Three hours later, reslice the drying batter into the squares of step 10A. | 12B. Lift screen with the batter on it, and place it onto a dehydrator tray. Place a circular screen on top of the batter, and invert and fit another dehydrator tray on top of the first dehydrator tray. |
| 12A. Continue to dehydrate the batter until its water activity has been reduced below 0.60, and preferably below 0.40, in order to eliminate any possibility of microbial activity. | 13B. Flip this two tray assembly, and remove the top dehydrator tray and circular screen. |
| 13A. Determine the cross-sectional area and tensile strength of a typical cracker. | 14B. Place lower dehydrator tray with its batter on. the dehydrator base unit. Place an empty dehydrator tray on top. Place the insulated dehydrator cover on top of the top tray. Set dehydrator temperature to 100° F. (37.8 C.). |
| 14A. Mill the cracker and determine $pH_f$, the pH value of a 6:1 slurry prepared from the cracker. Then $\delta pH_{LA} = pH_O - pH_f$. | 15B. 30 minutes after step 14B, slice the drying batter into 1/4 inch by 1 inch rectangles. |
| | 16B. Every 30 minutes for the next three hours, re-slice the drying batter into the rectangles of step 15B. |
| | 17B. Continue to dehydrate the batter until its water activity has been reduced below 0.60, and preferably below 0.40, in order to eliminate any possibility of microbial activity. |
| | 18B. Determine the cross-sectional area and tensile strength of a typical cracker. |
| | 19B. Mill the cracker and determine $pH_f$, the pH value of a 6:1 slurry prepared from the cracker. Then $\delta pH_{LA} = pH_O = pH_f$. |

Applicant will now describe the novel features of his invention referring to the several steps of his above method for making sprouted rice crackers.

The big advantage in drying the rice sprouts at step 2B is that the dried sprouts may be stored and milled as needed. But when the wet sprouts are ground to a paste (as in Baker's method), the crackers must be made immediately, as ground wet sprouts will start to sour noticeably after only a few hours.

The advantage in milling the dried sprouts to a flour as opposed to grinding the wet sprouts to a paste is that sprouts can be ground much more quickly and much more finely in a mill than in a food processor.

At step 4B, an amount of chia seed equivalent to the weight of the dried rice is measured out. It takes about a 1 to 1 ratio of whole chia seed to nongluten-containing ingredients to yield a cracker which holds together well. At step 5B, just the right proportion of water must be used. If too little water relative to chia seed is used, the rice and chia seed mixture will become too thick to be evenly spread on the dehydrator screen at step 11B. If too much water relative to chia seed is used, the chia seed and rice mixture will be too watery to be spread upon a screen at all and will ooze through the openings in the screen.

Rice crackers were made by Applicant's method. At step 8B, it is estimated that $pH_o$, the pH of a 6:1 slurry made from the batter would be about 6.0. And $pH_f$, the pH value of a 6:1 slurry made from the dehydrated product $pH_f$ was 5.0. Hence it is estimated that $\delta pH_{LA}$, the pH drop due to lactic acid souring would be about 6.0−5.0=1.0.

Whole chia seed has a number of advantages over ground chia seed:

1. Since the chia seed is not ground, not only will its interior nutrients be protected from oxidation, but bacteria will not have access to the seed's interior, effectively preventing any souring thereof.
2. The fewer the ingredients that are ground, the greater the energy savings will be, and the more quickly the resultant product can be prepared.
3. Not having its seed coat broken, whole chia seed resists rancidity much better than ground chia seed.

Crackers made from whole chia seed have a number of advantages over those background art crackers made from a large proportion of gluten containing grains:

1. Chia seed does not contain gluten to which many people are allergic.
2. Chia seed stirs easily into an aqueous slurry of the other ingredients, and, after having been thoroughly mixed together with them, quickly thickens the batter to such an extent that the batter can now be spread upon dehydrator screens, where the upper and lower surfaces of the batter dry simultaneously. This shortens drying time, limits bacterial souring, and, reduces energy costs. Further, the resultant product has no cracks and has a more uniform color and appearance; the upper and lower surfaces of the product are indistinguishable. (Suitable screen material would have a hole size of about 0.12 inches by 0.14 inches, and a strand thickness of about 0.05 inches. The screen material provides a perforated surface which gives drying air access to the lower surface of the drying cracker batter.) The type of drying surface provided by a supported screen, mesh, perforated surface or other functionally equivalent surface which gives drying air access to both the upper and lower surfaces of the drying batter simultaneously shall be called a "double-access drying surface". The upper surface of the double-access drying surface which contacts the lower surface of the drying batter shall be referred to as "the upper surface of the double-access drying surface".
3. Since the upper and lower surfaces are equally exposed to drying air, any souring of the other ingredients will be moderate, and the pH values of slurries prepared from the upper and lower surfaces of the dried end-product will be nearly equal.
4. Since batter containing sufficient chia seed holds together well even before being dehydrated, large quantities of batter can be spread upon each dehydrator screen without overflowing, thus dramatically increasing the yield from each dehydrator tray, and, again, reducing costs.

Step 7B is a very critical step. Since the chia seed very quickly absorbs water, Applicant originally thought that the chia seed had to be poured into the pail all at once and quickly stirred. In fact, the directions found on boxes of bulk-forming laxatives containing psyllium husks (which act similarly to chia seed in absorbing water, but neither as much as nor as quickly as chia seed) specify that the product must be quickly poured into a glass of water and drunk quickly before it has a chance to gel and thicken. But when chia seed is quickly poured all at once into the mixing pail, it tends to conglomerate and solidify into many large clumps which frustrates any attempt to evenly disperse the chia seed throughout the rest of the batter. This greatly hinders attempts to smoothly spread the batter on the drying surface, and furthermore results in clumps of chia seed in the final product, which renders the product unmarketable. After much trial and error, Applicant determined that the best way to add the chia seed is to very slowly pour in the chia seed while quickly stirring the mixture into which the chia seed is being poured (no more than about 1/300 of an ounce of chia seed per revolution of the mixing paddle per square inch of the surface area of the mixture in the mixing container).

The reason for the wait of step 9B is to give the chia seed a chance to absorb water from the rest of the batter thus stiffening or thickening it. With as little water as is being used here, the mixture very quickly becomes thick enough to be spread on dehydrator screens rather than upon solid sheets. The big advantage of using screens rather than solid sheets is that the batter after being spread on the screens dries on both the upper and lower surfaces simultaneously, thus doubling the rate at which a given thickness of batter dries, greatly reducing the bacterial souring in any milled ingredients which were added to the batter, and greatly facilitating much larger yields per dehydrator tray. Further, the screen peels off of the final product much easier than a solid dehydrator sheet would. If just the right proportions of chia seed, other ingredients (rice sprouts, here), and water are used, the dehydrator screen will peel off the final dried product with practically no sticking whatsoever.

The reason for placing the dehydrator circular screen on a smooth surface before spreading the batter on it is that the batter is somewhat stiff and consequently a considerable amount of pressure must be applied to spread and smooth the batter evenly over the dehydrator screen. Without a solid surface underneath the circular screen, the batter tends to be forced through the screen openings. Even with a solid surface underneath, the batter somewhat tends to fill in the screen openings. Therefore, at steps 12B and 13B, the screen with its batter is placed in a dehydrator tray, another screen is placed on top of the batter, an inverted dehydrator tray is placed on top of the first dehydrator tray. Each dehydrator tray has a circular wall surrounding the center hole with openings in the wall for air circulation. When one dehydrator tray is inverted and fitted on the other dehydrator tray, these walls interlock forming a tightly fitting two tray assembly. This whole two tray assembly is then flipped, the top tray (which was the bottom tray) is removed, and the screen is peeled off. Since the chia seed is very cohesive at this point, the screen peels off very easily. Wet chia seed sticks to itself much more strongly than it sticks to the screen and thus, as the screen is pulled away from the batter, the chia seed at or near the surface of the batter pulls away from the screen openings any batter which was partially forced through them when the batter was being spread on the screen. Now the batter is sitting on the screen which was placed on top of it in step 12B. Since the batter was never pressed onto this screen by any vigorous spreading action, once the batter is dry, it peels away from the screen very easily. In those products in which a sticky syrup like honey is not used, the screen literally falls away from the dried batter, thus not only greatly speeding up production, but also greatly simplifying cleanup.

It should be noted that products prepared according to the above methods will not develop the ugly disfiguring cracks common to products containing chia seed prepared without these methods. The first time Applicant prepared a batter containing whole chia seed, he spread the batter on dehydrator solid sheets rather than upon circular screens. As the batter dried, it developed ugly disfiguring cracks. And it was not obvious what, if anything, could be done to prepare a product without these ugly cracks which rendered the product unmarketable. The following factors have been found to wholly eliminate the unsightly cracks in the drying batter:
1. The chia seed to be added to the batter is added as follows: The chia seed is very slowly poured into the mixing container while quickly stirring the mixture into which the chia seed is being poured (no more than about 1/300 of an ounce of chia seed per revolution of the mixing paddle per square inch of the surface area of the mixture in the mixing container). This results in the chia seed being evenly dispersed throughout the batter thus preventing the forming of numerous clumps of chia seed in the batter.
2. Using sufficient whole chia seed in the batter to be dried, especially if the batter does not contain any gluten-bearing ingredients. If too little chia seed is used, the batter will not hold together well, and this contributes to cracks developing in the batter.
3. Repeatedly slicing the batter during the first few hours of drying. Repeatedly slicing the batter during the early hours of drying alleviates the pressures which develop in the batter crust as it dries.
4. Drying the batter on screens rather than on solid sheets. When solid sheets are used, the batter near the surface dries more quickly than the portion of the batter in contact with the solid sheet resulting in strains developing in the batter. These strains aggravate any tendency to cracking.
5. As batter dries, a crust tends to develop on the surfaces of the batter through which it is increasingly more difficult for moisture to escape as time passes. (This is known as "case-hardening".) Slicing the batter into thin slices (¼ inch or less) early and often in the dehydration process not only alleviates much of the strain which develops in the batter as it dries and shrinks, but also gives moisture many places to escape through the drying crust. This greatly reduces drying time and inhibits microbial activity.

Applicant has recently discovered that the agglutinant in chia seed can easily be separated from the chia seed and be used to agglutinate products which do not have chia seed as an ingredient. This agglutinant has a most unusual property—it has an effect out of all proportion to its weight; Very little need be used to agglutinate a product. One of the drawbacks of products containing whole chia seed is that the chia seed tends to stick somewhat between one's teeth thus resulting in a somewhat unsightly appearance. By using only the agglutinant extracted from chia seed rather than the whole chia seed, this negative consequence is avoided.

What is meant when it is said that the mucilaginous properties of whole chia seed cause products in which it is used to cohere is that when an aqueous mixture of the other ingredients is formed, and whole chia is stirred in, the mucilaginous seed coats of the chia seed dissolve and come into intimate contact with the other ingredients to such an extent that when the product is dried, the product coheres.

What is meant when it is said that the mucilaginous properties of the agglutinant derived from whole chia seed cause products in which it is used to cohere is that when an aqueous mixture of the other ingredients is formed and the agglutinant derived from whole chia is stirred in, this agglutinant dissolves and comes into intimate contact with the other ingredients to such an extent that when the product is dried, the product coheres.

The purpose of this invention is to produce a good tasting attractive appearing snack food from slightly germinated whole chia seed which:

1. is easy to chew—not only is the seed coat of whole chia seed relatively soft but it quickly dissolves in the mouth leading to a very easy to chew product.
2. does not have the sharp edges sometimes exhibited by products prepared exclusively with gluten containing grains.
3. holds together well. It is characterized by its use resulting in a food product which is firm to the touch, and substantially dry and non-gooey to the touch when so touched, so that the resultant food product makes a convenient snack food.
4. has good shelf-life and resists rancidity.
5. is low in gluten or is gluten-free. Certain people are allergic to wheat or cannot properly digest it leading to digestive distress. Their diet must be completely gluten-free.
6. has very few processing steps: the chia seed need not be previously sprouted and needs only to be stirred into a batter of the other ingredients. (When the chia seed is stirred into the batter, it absorbs water, and, during further processing, sprouts to a slight extent; hence, it is referred to as slightly germinated.) Further, the chia seed does not need to be milled into flour before being used to make crackers.
7. provides complete protection of the interior nutrients of the chia seed against the ravages of oxidation which would destroy some of those interior nutrients if the chia seed were ground into flour.
8. is unsoured. Since the chia seed is not ground into a paste or a flour which would expose the inner portion of the seed to lactic acid bacteria, it does not sour during the dehydration process which produces the final product. Further, since chia seed quickly absorbs all available water during the preparation process, this water is kept from those ingredients which have a tendency to sour, thus greatly retarding the souring of those ingredients.
9. is partially or slightly germinated. Slightly germinating chia seed will decrease its content of enzyme inhibitors and slightly increase enzymatic activity. And since it is slightly germinated, it also has increased vitamins over the unsprouted chia seed, and is somewhat better digested than unsprouted chia seed.
10. is of excellent and uniform appearance. This product is not disfigured by the ugly cracks which ruin the appearance of the background art products.
11. can be made relatively thick; hence, there are fewer dehydrator screens to clean for a given weight of end product.
12. the final product does not stick to the screens on which it was dried; hence, no oil is required in product preparation.
13. in one of its forms, has the organoleptic properties of dried figs: chewy, crunchy, and sweet.

Another purpose of this invention is to produce a good tasting attractive appearing snack food from the agglutinant derived from slightly germinated whole chia seed which:

1. does not have the sharp edges sometimes exhibited by products prepared exclusively with gluten containing grains.
2. holds together well. The resultant food product will be firm to the touch, and substantially dry and non-gooey to the touch when so touched, so that the resultant food product will make a convenient snack food. If the food product is touched with one's finger, it will not cling to one's finger, and if it is picked up between two fingers, it will not fracture.
3. is expected to have good shelf-life and resist rancidity.
4. is low in gluten or is gluten-free. Certain people are allergic to wheat or can not properly digest it leading to digestive distress. Their diet must be completely gluten-free.
5. has very few processing steps: the agglutinant derived from the whole chia seed needs only to be stirred into a batter of the other ingredients.
6. is unsoured. Since the agglutinant is derived from chia seed which has not been ground, it does not sour during the dehydration process which produces the final product.
7. is of excellent and uniform appearance. This product is not disfigured by the ugly cracks which ruin the appearance of the background art products.

4.1 OBJECTS AND ADVANTAGES

Accordingly, several objects and advantages of the instant invention are:

(a) to provide a gluten-free agglutinant which can be stirred into a batter of various other ingredients and consequently thicken the batter to such an extent that the batter can be piled higher on dehydrator screens than it ever before could be piled on dehydrator solid sheets with no more than a small amount of souring occurring in any sourable ingredients. The rapid drying which occurs when dehydrator screens are used greatly retards bacterial souring of any ingredients which were ground before being stirred into the batter.

(b) to provide easy to chew sprouted food products with pleasant taste and excellent shelf life and thus suitable for a dietary staple and a healthful snack food. The shelf stability of these products is due to the water activity of the product having been reduced to less than 0.80 for short term storage and to less than 0.60 for long term storage.

(c) to provide a quick drying method for making large quantities of good tasting sprouted products very economically and with significant energy savings. With each species, the batter not only can be made up to 1 inch thick, but also can be spread on dehydrator screens instead of dehydrator solid sheets thus greatly speeding up the dehydration process and reducing bacterial souring. Not only can larger batches of crackers now be obtained, but also fewer dehydrator trays and screens need be used, and considerably less cleanup is required.

(d) to provide methods of preparing sprouted seed products in which mold and fungal growths are entirely prevented.

(e) to provide a healthful product with not only a pleasant satisfying taste but also an attractive appearance as well.

(f) to provide a gluten free agglutinant for agglutinating all kinds of foods from the vegetable kingdom: fruits, vegetables, grains (both sprouted and unsprouted), sweet syrups (including honey), vegetable powders, etc.

(g) to provide low-gluten food products with a CFA in excess of 0.6, and gluten-free foods with a CFA of 1.0.

(h) to provide a food product with the organoleptic properties of dried figs: sweet, chewy, and slightly crunchy.

(i) to provide an agglutinant derived from whole slightly germinated chia seed which can be used as a nonsweet gluten-free agglutinant for various food products.

For the purpose of illustration of this invention, a preferred embodiment is shown in the accompanying drawings. It is to be understood that this is for the purpose of example only and that the invention is not limited thereto.

5.0 BRIEF DESCRIPTION OF THE DRAWINGS

6.0 DETAILED DESCRIPTION OF THE INVENTION

Figure 1:
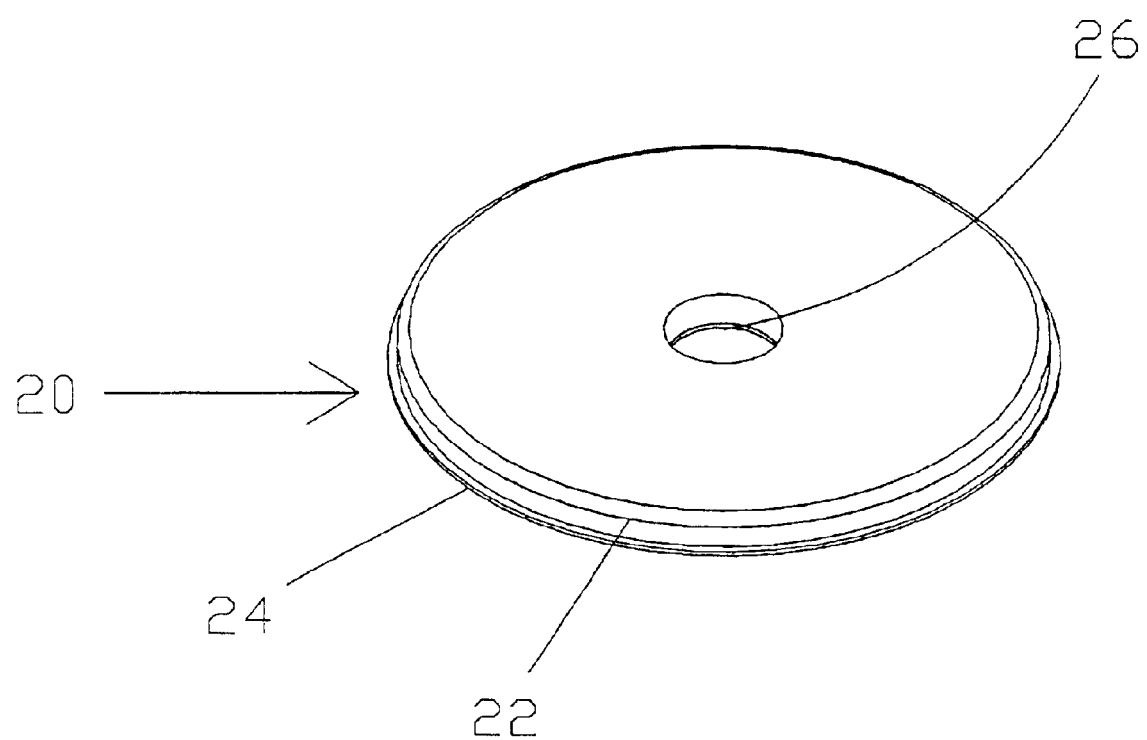
FIG. 1 shows a perspective view of one of the preferred embodiments on a dehydrator screen before being sliced.

In this section of his patent application, Applicant will describe the ingredients he uses and their sources, the equipment he uses and its sources, the proper setup of this equipment, and the methods for producing each of the three species of his invention.

6.1 DESCRIPTION OF INGREDIENTS USED IN MANUFACTURE OF INVENTION

| Ingredient | Source/Manufacturer |
| --- | --- |
| Certified Chemical-free Chia Seed | Garden Spot Distributors New Holland, PA 17557 |
| Nickabood's Desert Gold Unheated Unfiltered Honeys | Nickabood's Inc., 1401 Elwood Street, Los Angeles, CA 90021 |
| Hulled Chemical-free Sesame Seed | Garden Spot Distributors, New Holland, PA |
| Bernard Jensen's Apple and Grape Concentrates | Bernard Jensen Products, Solana Beach, CA 92075 |
| Organic Brown Teff Grain | Mountain Ark Trading Co. Fayetteville, AR 72701 |
| Certified Chemical-free Carob Powder | Garden Spot Distributors New Holland, PA 17557 |

6.2 DESCRIPTION OF EQUIPMENT USED IN MANUFACTURE OF INVENTION

| Equipment | Source/Manufacturer |
| --- | --- |
| Harvest Maid ™ Model FD 1000 Food Dehydrator | Alternative Pioneering Systems, Inc., Minneapolis, MN |
| Kitchen Mill ™ Electric Flour Mill | K-Tec, American Fork, Utah. Kitchen Mill is a trademark of K-Tec Corporation |
| Presto® SaladShooter ™ Electric Slicer and Shredder | National Presto Industries, Inc., Eau Claire, WI 54703 |

The Harvest Maid™ Model FD 1000 Food Dehydrator is a four tray dehydration unit (with optional additional trays) which has a circular base unit containing a motorized fan and a core filament heating element. The trays of material to be dehydrated are stacked on the circular base unit, the insulated cover is placed on the top tray, the desired temperature is selected via a rotary dial, and the power is turned on. The construction of the circular interlocking trays allows warm air currents to flow in a circular pattern from the bottom tray to the top tray thus providing fast even drying. Due to the design and strength of the fan motor, the circular trays can be stacked thirty high. For dehydrating solids, a circular screen (the registered trademark name is "Clean-A-Screens") is placed in each tray before putting the solids in the trays. For dehydrating liquids, a solid circular sheet (Alternative Pioneering Systems trademark name for these items is "Fruit Roll-Up Sheets") is placed in each tray, and the liquid is poured on the sheets. Except for the fact that this particular model dehydrator seems to dry much faster than the other models which have been used, the type of dehydrator used is probably not critical to the success of the methods used to make Applicant's invention.

The Kitchen Mill™ Electric Flour Mill is used to mill the dehydrated sprouted wheat used in the method for making the Chia and Sprouted Wheat Crackers, and also the dehydrated sprouted wheat and millet used in the method for making Chia Scramblers both of which methods are described below. The milling chamber's concentric spinning metal sections which burst the seed into flour do not actually touch which results in a cooler milling operation than with most other flour mills. Furthermore, the ease with which an 8 inch stem thermometer may be mounted transversely in the flour mill's Lexan™ Flour Pan just below the point where the flour leaves the milling chamber, makes it easy to monitor the temperature of the sprouts as they are being ground. When the temperature gets too high, one need only turn off the mill and refrigerate it until the temperature is once again safe for the vital nutrients in the sprouts. And since this mill does not use grinding stones, there is no possibility that stone grit will mix with the flour.

The Presto® SaladShooter™ Electric Slicer and Shredder is used to shred fruits and vegetables. Following the instructions in the instruction booklet, the food chamber assembly is assembled with the Shredder Cone and is mounted on the motorized base. The Shredder Cone has 24 sharp projections which shred fruits and vegetables into slices which are about 1¾ inches long, ⅛th of an inch wide, and ¹⁄₁₆th of an inch thick.

6.3 SETUP OF EQUIPMENT USED IN MANUFACTURE OF INVENTION

6.3.1 Method of Manufacture of Despoked Trays and Screen-forms

The circular dehydrator trays of the Harvest Maid Model FD 1000 Food Dehydrator are about 15¼ inches in diameter. Starting from the circular outer wall of a dehydrator tray and heading toward the circular hole at the center of a dehydrator tray, one successively comes upon the thicker outer wall just mentioned, a thinner circular inner wall, thin plastic spokes pointing toward the center of the tray, and a finned wall surrounding the hole in the very center of the dehydrator tray. The outer wall of the tray is about five-sixteenths of an inch thick in the horizontal direction, and about 1 inch high in the vertical direction. The thickness of the inner wall is about ¹⁄₁₆th of an inch in the horizontal direction. Leading from the inner wall of the tray to the 2⅛ inch diameter finned central hole of the tray are numerous thin plastic spokes which provide the support for the sheet or screen to be placed in the dehydrator tray. These trays are stacked one above the other on the dehydrator base unit. Due to the height of the outer wall of the tray and the thickness of the spokes leading to the central hole of the tray, batter can be put in each tray to a depth of no more than about three-fourths of an inch. Therefore, when it is desired to place batter which is thicker than three-fourths of an inch on a dehydrator screen, it is necessary to remove the entire spoked area of one or more of the trays by cutting the spokes at the point where the spokes meet the inside surface of the inner wall of the tray. Then after placing the batter on a dehydrator screen, this screen with its batter can be placed in one of the original trays which still retains its spoked area, and this tray placed on the dehydrator base unit. Then one or more trays with their spokes removed can be stacked on top of this tray (thus providing head room for the batter), and an empty dehydrator tray is placed on top (for additional ventilation).

(1) Using a knife or a saw, remove the entire spoked area from one of the dehydrator trays. This tray, hereinafter called the despoked tray, can be used in each of the methods for making chia seed-based products.

(2) On a sheet of black paper, draw two concentric circles, the outer circle with a diameter equal to the diameter of a circular dehydrator screen minus ¾ inch and the inner circle with a diameter equal to the diameter of the hole at the center of the screen plus ¾ inch. Cut along the circumference of each of the two circles thus producing a doughnut-shaped form, hereinafter called the screen-form, with the same shape as, but somewhat smaller in size than, a dehydrator screen.

6.4 OPERATION OF EQUIPMENT USED IN MANUFACTURE OF INVENTION

6.4.1 Operation of the Kitchen Mill

The method for using the Kitchen Mill Flour Mill for milling sprouts is as follows:

(1) Refrigerate the flour mill until its mounted thermometer reads less than 50° F.

(2) Measure out the required amount of dried sprouts.

(3) Select the Kitchen Mill's "Fine Flour Texture Setting" by turning the arrow on the rotary dial to the smallest dot, and turn on the Kitchen Mill.

(4) Place 1 cup of dried sprouts in the hopper of the mill. The dried sprouts will be milled to flour and fall onto the long stem of the thermometer mounted transverse the flour mill pan. Whenever the thermometer records a temperature greater than 104° F., refrigerate the mill until the temperature has dropped below 70° F. and continue milling the flour. Continue in this way until all the sprouts have been milled.

6.4.2 Method of Use of Despoked Trays and Screen-forms

After preparing the batter to be dehydrated, proceed as follows:

(1) Place an 18 by 18 inch sheet of white paper on a flat surface. Place the screen-form made by the "Method of Manufacture of Despoked Trays and Screen Forms" described in §6.3.1 of this specification in the center of the white sheet of paper. Place a ¼th inch thick flat sheet of transparent lead-free glass or FDA approved plastic over the pieces of paper. The outline of the black screen-form can now be seen through the glass or plastic sheet.

(2) Record the time. Wait until the batter has sufficiently thickened that it will hold its shape when the following step is performed.

(3) Pour the batter to be dehydrated on the glass or plastic transparent sheet just over the place where the screen-form can be seen through the transparent sheet. Contour the batter to the shape of the screen-form as seen through the transparent sheet. Spread the batter smoothly to a uniform thickness on the transparent sheet avoiding the central hole of the screen-form as seen through the transparent sheet. (Or, the batter may be spread uniformly within the outer circumference of the screen-form as seen through the transparent sheet even covering up the central hole. Then a hole can be formed in the middle of the batter the same size as the central hole as seen through the transparent sheet.)

(4) As the batter rests on the transparent sheet, the chia seeds in the batter gradually absorb liquid from the batter making the batter firmer and sturdier. Eventually a point in time is reached where the batter is sufficiently sturdy that it can be sliced and lifted off of the transparent sheet without breaking apart. Therefore, let the batter on the transparent sheet set until it is firm enough to be sliced and lifted off the transparent sheet with a spatula without breaking. (This time should be in the order of about 45 minutes for batters containing a sweetener and about 15 minutes for batters containing little or no sweeteners. This is because chia seed not only more slowly absorbs water but also much less water in a given period of time the larger the ratio of sweeteners to water.) When the batter has become sturdy enough to be lifted off of the transparent sheet without falling apart, it is also of sufficient firmness to be placed on a screen without significant leakage through the screen apertures.

(5) Slice the batter lengthwise into long slices (no more than about 2 inches wide). Measure the length of the blade of the spatula to be used at step 5 to lift the slices of batter off of the transparent sheet, and slice the batter crosswise into pieces of that length.

(6) Place a circular screen in a dehydrator tray. Using a spatula, lift the slices of batter off the transparent drying sheet and place on the circular screen, so that the slices are parallel to one another with slight spaces between the individual slices (for ventilation purposes). These long slices of batter should fit perfectly onto a single dehydrator screen. Now, slice the 2 inch wide batter slices into ¼ inch by 1 inch rectangles.

(7) Place the dehydrator tray with its slices of batter onto the dehydrator base unit. Place the despoked tray made by the "Method of Manufacture of Despoked Trays and Screen Forms" described in §6.3.1 of this Specification above the dehydrator tray having the batter. Now place an empty dehydrator tray on the despoked dehydrator tray. (This provides additional "head room" and ventilation for the drying batter.)

(8) Place the insulated dehydrator cover on the top tray to minimize heat loss during the dehydration process. Set the rotary temperature selection dial to indicate a temperature of 104° F. (40° C.)., and turn on the dehydrator.

6.5 DESCRIPTION OF PREFERRED METHOD TO MANUFACTURE INVENTION

6.5.1 Introduction

6.5.1.1 Circumstances of Conception

"It is the glory of God to conceal a thing; but the honor of kings is to search out a matter." Proverbs 25:2

A brief word about how Applicant happened to invent his new line of products is in order.

After noticing that when chia seed is soaked in an aqueous mixture of carob powder and honey, it tends to absorb the honey and become coated with the carob powder, Applicant considered making a carob coated chia seed breakfast cereal. This cereal was to consist of discrete chia seeds, each seed coated with carob powder, and the carob powder being held to the surface of the chia seed by the honey which the chia seed had absorbed from the mixture. This cereal was to be called "Chia Royale". A mixture of 8 ounces of honey, 4 ounces of apple concentrate, 8 ounces of carob powder, 8 ounces of chia seed, and three pints of distilled water was prepared. After being stirred, the mixture was allowed to sit for one hour and 40 minutes, and then it was poured on dehydrator solid sheets in dehydrator trays. Twelve ounces of batter was poured onto each solid sheet.

The next day, it was noticed that this batter consisting of slightly germinated chia seed, carob powder, honey, apple concentrate, and water, instead of breaking up into discrete particles, was becoming a solid flexible mat. This mat was then sliced into squares. After drying for a few days, the result was a very flexible delicious cracker. But Applicant realized that this was not the essential invention. Applicant now had to see what the result would be of dehydrating a batter consisting of just chia seed and water alone. It was suspected that if the end result were a cracker, the cracker would be so exceedingly fragile that with the slightest jar, it would separate into its individual seeds.

Four ounces of chia seed was stirred into 1.5 pounds of 110° F. (43 C.) water. After stirring well, the mixture was allowed to set for 50 minutes. This mixture was then poured onto a solid sheet in a dehydrator tray. The dehydrator tray was placed on a Harvest Maid FD-1000 dehydrator which had been preheated to 115° F. (46 C.). The next morning, the drying batter was examined. It seemed to be holding together much better than expected. The batter was then sliced into squares. The pie-shaped batter was turned over and put back on the dehydrator tray.

The drying batter was checked that evening, and it appeared to be about 70% dry. The next morning, the batter was checked again and it was now thoroughly dry. Holding a piece in his hand, Applicant bent a thin piece of the dried chia seed batter and noted that it broke fairly easily. Taking another piece in his hands, Applicant tried to stretch it and noted that it had great tensile strength and could not be easily pulled apart. So Applicant realized that slightly germinated chia seed would be an excellent substitute for gluten in certain applications. Further, it was noted that crackers made of slightly germinated chia seed alone have a pleasant taste and make an excellent snack food.

Recently, Applicant tried again to make a carob coated chia seed breakfast cereal. This cereal was to consist of discrete chia seeds each seed coated with carob powder, the carob powder being held to the surface of the chia seed by the agglutinating properties of chia seed. Applicant mixed 6 ounces of carob powder with 8 ounces of water, and stirred 0.6 ounces of chia seed into the carob-water mixture. Applicant figured that the high by weight ratio of carob powder to chia seed would ensure that each chia seed would be thoroughly coated with carob powder and, consequently, would not stick to adjacent chia seeds. When this mixture was dehydrated, however, the resultant product was hard and had great tensile strength. Apparently the seed coat of the chia seed dissolves in water and disperses throughout the water thus agglutinating the carob powder, resulting in a very hard end product.

Next applicant stirred 8 ounces of chia seed into 10 pints of water, and attempted to separate the chia seeds' agglutinant from the chia seed. Applicant succeeded by pouring some of the wet chia seed into a kitchen strainer, and forcing the chia seed against the strainer openings with a curved bowl, thus pushing a slimy liquid through the strainer openings. Applicant calls this slimy liquid the "chia agglutinant". In this way, Applicant separated out 9 ounces of a water and chia agglutinant mixture. This mixture is colorless, clear, practically tasteless, and slimy to the touch. For comparison, Applicant made a carob and water mixture and dehydrated it. The result was a soft carob confection which had moderate tensile strength. Next Applicant stirred 3 ounces of carob powder into 4 ounces of the water-chia agglutinant mixture and dehydrated it. The result was a hard crisp product with great tensile strength. Finally, Applicant dehydrated 5 ounces of the water and chia agglutinant mixture on a dehydrator solid sheet. The result was a very thin transparent film on the dehydrator sheet which weighed less than 0.01 ounce. Apparently, a small amount of this agglutinant has great agglutinating power.

6.5.1.2 Species, Varieties, and Subvarieties of Invention

Applicant's Invention has Three Species:

(1) Chia crackers in which dehydration is utilized to reduce the water activity of the crackers. This is the preferred embodiment of applicant's invention. For short term storage (one week or less), the water activity need only be reduced to less than 0.80. A water activity of less than 0.80 suppresses the growth of many bacteria, yeasts, and molds. For longer term storage, the water activity should be reduced to below 0.60. A water activity below 0.60 will not support microbial growth. Most preferably, however, the water activity of the crackers is reduced below 0.40, and the crackers are placed in an area in which the relative humidity is 0.65. The crackers are then allowed to rehydrate until their water activity is 0.65. This rehydration step makes the. crackers somewhat moister and easier to chew.

(2) Chia crackers in which establishment of an osmotic pressure differential is used to reduce the water activity of the crackers. For short term storage (one week or less), the water activity need only be reduced to less than 0.80. A water activity of less than 0.80 suppresses the growth of many bacteria, yeasts, and molds. For longer term storage, the water activity should be reduced to below 0.60. A water activity below 0.60 will not support microbial growth.

(3) An agglutinant derived from wet slightly germinated chia seed. A tiny amount of this agglutinant is effective in agglutinating a batter consisting of other ingredients.

There are two varieties of each of the first two species: Chia crackers prepared with a sweetener and chia seed crackers prepared without a sweetener.

There are four subvarieties of the "without-sweetener" variety: Plain Chia Crackers, the Unmilled Chia Cracker, Chia and Sprouted Wheat Crackers and the Chia Vegetable Snack. There are three subvarieties of the "with-sweetener" variety: Sweetened Chia Crackers, Carob Flavored Chia Crackers, and the Chia Fruit Snack.

6.5.2 The Method

NOTE 1: In each of the below methods, the water activity of the batter is reduced. Some of the methods utilize dehydration to reduce water activity; others of the methods use Osmotic Pressure Differential Establishment to reduce water activity: For short term refrigerated storage (one week or less), the water activity is reduced below 0.80. For longer term storage the water activity is reduced below 0.60. Most preferably, however, the water activity of the crackers is reduced below 0.40, and the crackers are placed in an area in which the relative humidity is 0.65. The crackers are then allowed to rehydrate until their water activity is 0.65. This rehydration step makes the crackers somewhat moister and easier to chew. The term "water activity" ($a_w$) is used herein in its usual context to mean the ratio of the fugacity of water in the system being studied (f) to the fugacity of pure water ($f_o$) at the same temperature. Hence the water activity of pure water is 1.00. The water activity of the products and compositions herein can be measured using well-known physical chemical techniques and commercially available instruments.) By "water activity reduction" is meant mean any process and its associated equipment which can be used to reduce the amount of water in a product which is available for the growth of microorganisms. Each group of microorganisms has a different minimum water requirement to support growth. The purpose of water activity reduction methods is to reduce the amount of water in a product which is available to microorganisms in order to suppress their growth so that these products will be stable under storage conditions. For short term refrigerated storage (a week or so), it is sufficient to reduce the water activity of a product below 0.80. For longer term storage, the water activity should be reduced below 0.60, which is lower than the lowest of the minimum requirements for microorganisms. If microorganisms are sufficiently deprived of water, they will no longer grow. The following table from page 10 of the fourth edition of "Food Microbiology" by Frazier and Westhoff (McGraw-Hill Book Company, 1988) shows the lowest water activity values permitting growth of spoilage organisms:

| Group of microorganisms | Minimal $a_w$ value |
| --- | --- |
| Many bacteria | 0.91 |
| Many yeasts | 0.88 |
| Many molds | 0.80 |
| Halophilic ("salt tolerant") bacteria | 0.75 |
| Xerophilic ("drought tolerant") fungi | 0.65 |
| Osmophilic ("high osmotic pressure tolerant" yeasts | 0.60 |

In order to inhibit the growth of many bacteria, yeasts, and molds, the processing steps used to produce Applicant's invention include the step of reducing the water activity of the products to less than 0.80. Preferably the water activity of these products is reduced to less than 0.65 to inhibit the growth of xerophilic fungi. More preferably the water activity of these products is reduced to less than 0.60 to inhibit the growth of all microorganisms. Products with a water activity of less than 0.80 are suitable for short term refrigerated storage. Products with a water activity of less than 0.60 are suitable for longer term storage. Most preferably, however, the water activity of these products is reduced below 0.40, and the crackers are placed in an area in which the relative humidity is 0.65. The crackers are then allowed to rehydrate until their water activity is 0.65. This rehydration step makes the crackers somewhat moister and easier to chew.

6.5.2.1 Chia Crackers Prepared by the Dehydration Method of Water Activity Reduction NOTE: For best results, the relative humidity of the atmosphere about the drying batter should be maintained below 40%, and preferably even lower. The lower the relative humidity of the atmosphere about the drying batter, the quicker will dehydration of the batter proceed, thus giving the lactic acid bacteria in the batter a much shorter time in which to produce lactic acid before the water activity of the drying batter drops below 0.91. (0.91 is the minimum water activity level required to support bacterial growth.) Further, the relative humidity of the atmosphere about the drying batter must be prevented from rising above 100% times the desired water activity of the final product. For example, if the desired water activity of the product is 0.35, the relative humidity of the atmosphere about the drying batter should be maintained below 35%. Keeping the relative humidity below 40% greatly reduces drying time, thus reducing bacterial souring, and preventing mold. If, at any time, the relative humidity is allowed to climb above 70%, molding is encouraged. Keeping relative humidity below 70 percent is absolutely essential to product success. If this is not done, product success is unlikely regardless of what other measures are employed.

It is preferred that the operations of dehydrating the sprouts, preparing the cracker batter, and dehydrating the cracker batter be performed in a closed room or area in order that the temperature and relative humidity of the atmosphere about the drying products can be carefully controlled. Throughout this specification, the term "Preparation Room" will be used to refer to the closed room or area in which product preparation activities which involve dehydration take place. It is preferred that the temperature in the Preparation Room be maintained in the range of 90° to 104° F., and that the relative humidity of the air (atmosphere) in the Preparation Room be maintained below 40%.

For each of the methods below, it is preferred that one additional step be added after the water activity of the sliced batter is lowered to its final value. This step is to again rehydrate the sliced batter pieces until their water activity is between 0.60 and 0.70, and most preferably 0.65. This can be done by leaving the crackers in refrigerated storage with the relative humidity of the refrigerated storage area set at a carefully controlled 65%. Every day or so the water activity of the sliced batter is checked, and when the water activity of the sliced batter is 65%, the sliced batter pieces are packaged in a room whose relative humidity is 65%. Crackers with a water activity of 65% are moister and much easier to chew than crackers with a lower water activity.

6.5.2.1.1 Method for Plain Chia Crackers

The only ingredient in these crackers is unmilled whole slightly germinated chia seed. Hence the CFA of these crackers is 1.0. As will be shown, the crackers, although not containing any gluten, hold together well. The optimal amount of water required at step 2 seems to be about twice the weight of the chia seed used. If less water is used, the chia seed batter is extremely difficult to spread. If much more water is used, some of the water will drip through the screens. Further, dehydration time and electric costs climb proportionally. As noted in the discussion of background art, chia seed will eventually absorb about twelve times its weight of water. With all of the below products, the amount of chia seed, water, and other ingredients can be varied. As a rough rule of thumb, when adding or subtracting one part of chia seed, at least 6 parts of water should be added or subtracted for best results. One part of a poorly absorbent seed like sesame seed requires about one part of water to be added. One part of a milled grain requires about 1.3 parts of water to be added. One part of honey actually requires a reduction in the amount of water used due to the osmotic pressure effect. (Osmotic pressure is the force created across a semipermeable membrane-in this case, the cell walls of the chia seeds-separating two solutions of different concentrations. It results in the passage of water from the region of its greater concentration to a region of its lesser concentration.) Chia seed absorbs less water from sweetened liquids thus requiring the use of less water. If too much sweetener is used, however, the chia seeds will not absorb any water from the sweetened liquid, and its purpose in this invention will not be realized.

Figure 2:
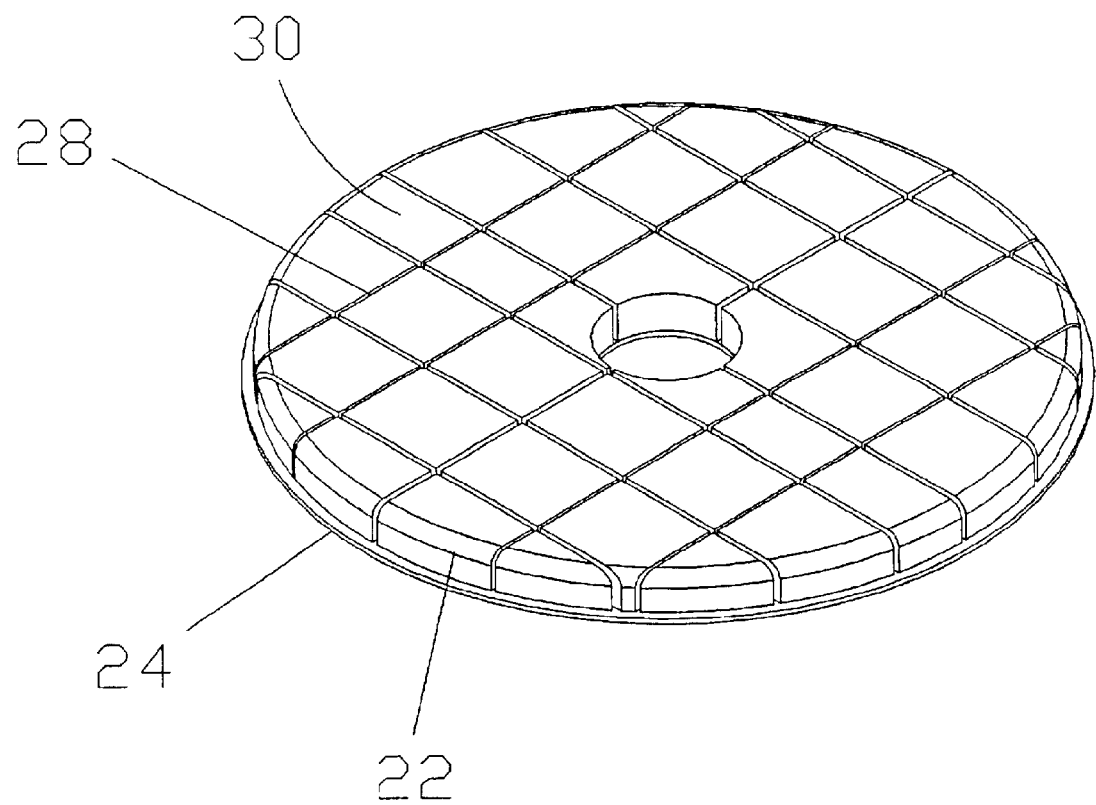
FIG. 2 shows a perspective view of one of the preferred embodiments on a dehydrator screen after having been sliced.
Figure 3:
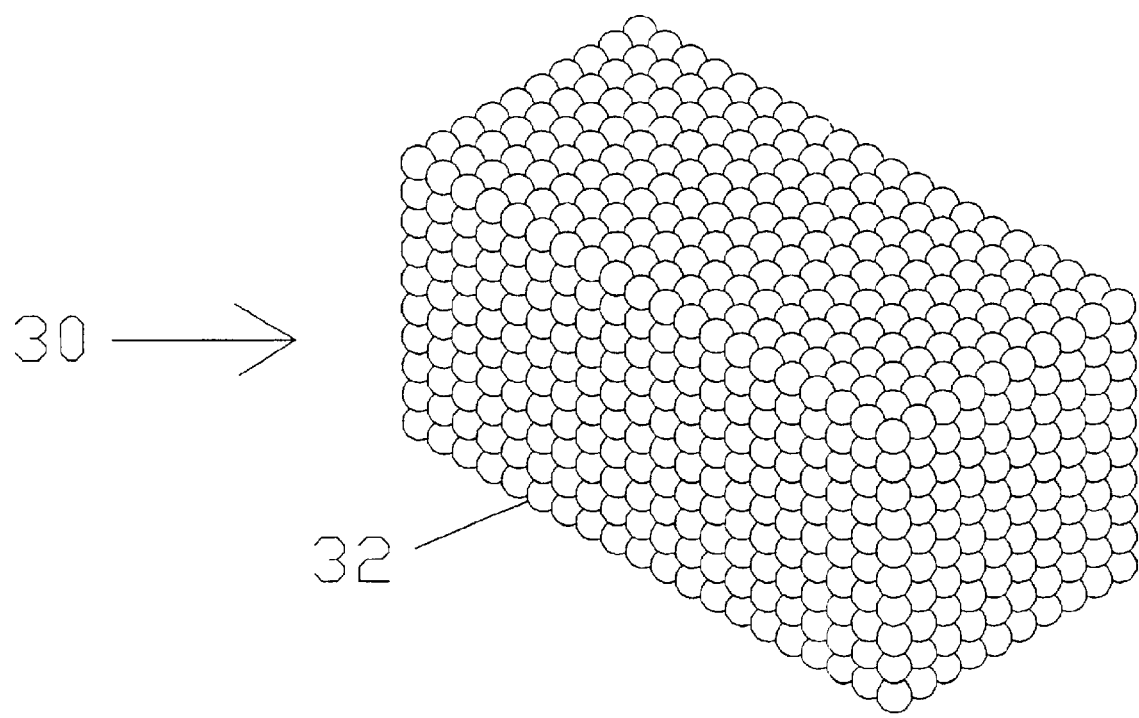
FIG. 3 shows an enlarged perspective view of one piece of one of the preferred embodiments.
Figure 4:
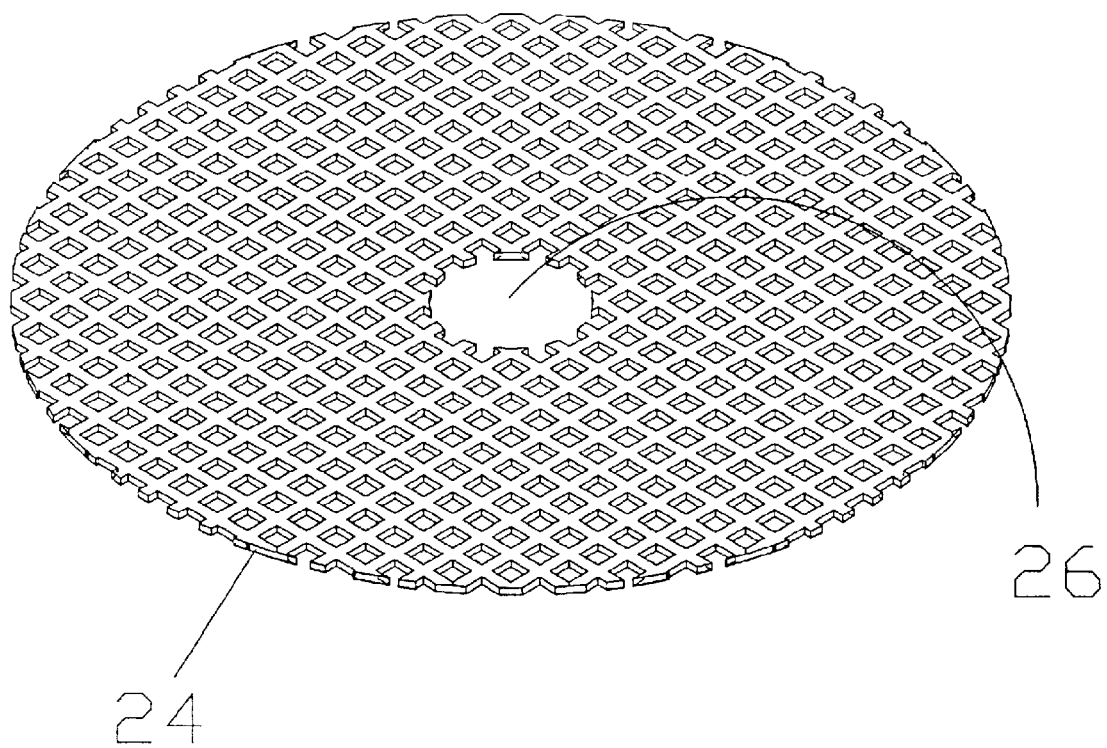
FIG. 4 shows a perspective view of a dehydrator screen.

The Method for Making Plain Chia Crackers is as Follows:

1. Utilize a dehumidifier to reduce the relative humidity of the room in which the product will be made to less than 40%. (If the relative humidity climbs above about 65%, mold may form on the drying batter.)
2. Pour 2 pounds 14 ounces of 104° F. (40° C.) distilled water into a suitably sized round stainless steel or plastic container (the mixing container) which complies with FDA regulations.
3. While stirring vigorously, very slowly pour 1 pound 7 ounces of certified chemical-free whole chia seed into the mixing container near its inside wall (no more than about 1/300 of an ounce of chia seed per revolution of the mixing paddle per square inch of the surface area of the mixture in the mixing container), and stir vigorously for five minutes. This vigorous stirring further reduces the possibility of the chia seed clumping together, and, consequently, not being evenly wet by water.
4. The batter for the Plain Chia Crackers consists of 1 pound 7 ounces of chia seed and 2 pounds 14 ounces of distilled water. Thus, total solids is 23 ounces and the total water is 46 ounces. (Thus the batter is one-third solids and two-thirds water.) Remove 1.5 ounces of batter. Determine the pH value of a 6:1 slurry of this batter as follows: 1.5 oz. of this batter consists of 0.5 oz. of chia seeds and 1 oz. distilled water. In other words, this batter consists of 0.5 oz. of solids and 1 oz. of water. Add 2 oz. of distilled water to the 1.5 oz. of batter to make a 6:1 slurry, and stir well. Its composition, is now 3 oz. water and 0.5 oz. of solids. Measure the pH value of this 6:1 slurry. It should be about 6.0. Call the measured pH of this 6:1 slurry $pH_o$.
5. Allow this batter to set for 10 minutes. (After 10 minutes, the batter should have thickened enough so that it can be spread on circular dehydrator screens 24 (FIGS. 1 and 4) instead of needing to be spread upon circular dehydrator sheets.)
6. Place a 19 inch diameter pizza platter on a table.
7. Place a circular dehydrator screen 24 on the pizza platter.
8. Pour the batter onto the circular screen 24.
9. Evenly spread the batter 22 around on the screen 24, avoiding, of course, the screen's center hole 26. (The pizza platter keeps the batter from squeezing through the screen openings as pressure is applied.) FIG. 1 shows the batter 22 evenly spread around on the screen 24.
10. Lift the screen 24 with the batter on it and place it onto a dehydrator tray. Place another screen on top of the batter, and invert and fit another dehydrator tray on top of the first dehydrator tray. (Each dehydrator tray has a circular wall surrounding the center hole with openings in the wall for air circulation. When one dehydrator tray is inverted and fitted on the other dehydrator tray, these walls interlock forming a tightly fitting two tray assembly.)
11. Flip this two-tray assembly, and remove the top dehydrator tray and screen. (Since the batter is moist, the screen should peel away easily.) The batter is now sitting upon a screen, onto which it was never pressed by the pressure of spreading. Consequently, after the batter has dried, it will not stick to this screen, and the screen can be easily removed.
12. Place the lower dehydrator tray which contains the batter on the dehydrator base unit. Place an empty dehydrator tray on top of the tray containing the batter. (This provides additional ventilation.) Place the insulated dehydrator cover on the top tray to minimize heat loss during the dehydration process. Set the rotary temperature selection dial of the dehydrator to indicate a temperature of 104° F. (40° C). Turn on the dehydrator. (An alternate to steps 5–12 above is given in §6.4.2, Method of Use of Despoked Trays and Screen-Forms. The chief advantage of this alternate method is it eliminates the tremendous effort required to spread the batter in step 9 above. The chief disadvantage of this alternate method is that it means one extra drying surface to be cleaned.)
13. Thirty minutes after step 12, slice the drying batter into ¼ inch by 1 inch rectangles, and put the tray back on the dehydrator base unit. The slicing of the batter into thin slices breaks the drying crust of the batter in many places allowing moisture to evaporate through the slice marks and greatly reduces drying time. (FIG. 2 shows a batter 22 sliced into rectangles 30 approximately 2" by 2½". A typical slice mark is shown at 28.)
14. Every 30 minutes for the next three hours, re-slice the drying batter into the rectangles 30 of step 13.
15. Continue to dehydrate the batter until its water activity has been reduced below 0.60, and preferably below 0.40. The result is plain chia crackers. A diagrammatic perspective view of a cracker is generally shown by 30 of FIG. 3. A diagrammatic representation of a chia seed is shown by 32.
16. Determine the cross-sectional area and tensile strength of a typical cracker. (Tensile strength is the resistance of a material to a force tending to tear it apart.)
17. Mill 0.5 oz. of crackers and prepare a 6:1 slurry from 3 oz. of distilled water and 0.5 oz. of crackers. Measure the pH value of this slurry. This pH value is called $pH_f$. Then $\delta pH_{LA}$ for crackers made from whole chia seed=$pH_o - pH_f$.
17A. Then place the crackers of Step 15 in a refrigerated area in which the relative humidity is 0.65, and allow the crackers to rehydrate until their water activity is 0.65. This rehydration step makes the crackers somewhat moister and easier to chew. The result is referred to as remoistened crackers. (But be careful here; if the relative humidity is allowed to rise above 65%, mold may form on the crackers.)
18. In order to investigate the degree of souring which can be expected when crackers are made with milled chia seed instead of whole chia seed, perform steps 1 through 17 above but using milled chia seed instead of whole: chia seed at step 3. Then, perform steps 19–20 below.
19. Pour the slurry of step 17 onto a solid dehydrator sheet, and dehydrate it to a water activity of less than 0.40.
20. Mill the dehydrated product of step 19, and prepare a 6:1 slurry from 3 oz. of distilled water and 0.5 oz. of the milled product. Measure the pH value of this slurry. This pH value is called $pH_f$. Then $\delta pH_{LA}$ for crackers made from milled chia seed=$pH_o - pH_f$.

6.5.2.1.2 Method for Making Unmilled Chia Crackers

With the exception of the powdered dulse, this cracker does not contain any milled ingredients thus providing great protection for its interior nutrients against the ravages of oxidation. Further, in the preparation of this cracker, bacterial souring simply does not take place. To summarize, since none of the ingredients are milled (except dulse by the manufacturer), there is a big energy savings here. Not only is this product completely gluten free but it provides full protection for interior nutrients against the ravages of oxidation. It is very easy to prepare, can be spread very thickly on dehydrator screens, does not sour at all, and dries very quickly. These crackers have a CFA of 1.00.

The Method for Making Unmilled Chia Crackers is as Follows:

1. Reduce the relative humidity of the atmosphere in the Preparation Room (the closed room or area in which product preparation activities take place) to less than 40%
2. Pour 1¼ pounds of distilled water into a suitably sized round stainless steel or plastic container (the mixing container) which complies with FDA regulations. Add 12 ounces of sesame seed and 1 ounce of caraway seed, and stir well. Allow the sesame and caraway seeds to soak for at least 8 hours in order to destroy some of the enzyme inhibitors in the seeds and to increase enzymatic activity slightly.
3. Measure out:
   (a) 1.5 pounds of certified chemical-free chia seed
   (b) 1.5 ounces of certified chemical-free dried teff sprouts (from teff grain which has been sprouted for 24 hours and then dried to a water activity of 0.40).
   (c) 3 ounces of dulse powder
4. Pour an additional 3¼ pounds of 104° F. (40° C.) water into the mixing container, add dulse powder, and stir well. Add teff sprouts and stir well. (Since teff is the smallest of all seeds, the dried teff sprouts in the product are very easy to chew. The method for growing teff sprouts is similar to the method for growing alfalfa sprouts and is well known to those skilled in the art.)
5. While stirring vigorously, very slowly pour chia seed into the mixing container near its inside wall (no more than about 1/300 of an ounce of chia seed per revolution of the mixing paddle per square inch of the surface area of the mixture in the mixing container), and stir vigorously for five minutes.
6. The batter for the Unmilled Chia Crackers consists of 1 pound 8 ounces of chia seed, 12 ounces sesame seed, 1 ounce caraway seeds, 1.5 ounces of teff sprouts, 3 ounces of dulse powder, and 4 pounds 8 ounces of distilled water. Thus, total solids is 41.5 ounces and the total water is 72 ounces. (Thus the batter is 36.6 percent solids and 63.4 percent water.) Remove 1.5 ounces of batter. Determine the pH value of a 6:1 slurry of this batter as follows: 1.5 oz. of this batter consists of 0.55 oz. of solids and 0.95 oz. distilled water. Add 2.35 oz. of distilled water to the 1.5 oz. of batter to make a 6:1 slurry, and stir well. Its composition, is now 3.3 oz. water and 0.55 oz. Of solids. Measure the pH value of this 6:1 slurry. It should be about 6.0. Call the measured pH of this 6:1 slurry $pH_o$.
7. Let set for 20 minutes. During this 20 minute period, the chia seeds absorb water from the surrounding batter, thus thickening it. (If less water is used at Step 4, this 30 minute wait can be reduced correspondingly, but the batter will be somewhat harder to spread at Step 11.)
8. Place a 19 inch diameter pizza platter on a table.
9. Place the first or next circular dehydrator screen on the pizza platter.
10. Pour 3½ pounds of batter onto the circular screen.
11. Spread the batter evenly around on the screen, avoiding, of course, the screen's center hole.
12. Lift the screen with the batter on it, and place it onto the first or next dehydrator tray. Place another screen on top of the batter, and invert and fit another dehydrator tray on top of the dehydrator tray containing the batter, such that the center walls of the two trays interlock.
13. Flip this two-tray assembly, and remove the top dehydrator tray and screen.
14. Place the lower dehydrator tray with the batter on the dehydrator base unit. Place an empty dehydrator tray on top of the tray containing the batter. (This provides additional ventilation.)
15. Repeat steps 9–14 until all of the batter has been placed on dehydrator trays. This procedure should yield 2 trays of batter. Place the insulated dehydrator cover on the top tray to minimize heat loss during the dehydration process.
16. Set the rotary temperature selection dial to indicate a temperature of 104° F. (40° C.). Turn on the dehydrator. (An alternate to steps 7–16 above is given in §6.4.2, Method of Use of Despoked Trays and Screen-Forms. The chief advantage of this alternate method is it eliminates the tremendous effort required to spread the batter in step 11 above. The chief disadvantage of this alternate method is that it means one extra drying surface to be cleaned.)
17. Thirty minutes after step 16, slice the drying batter in each tray into ¼ inch by 1 inch rectangles, and put the trays back on the dehydrator base unit.
18. Every 30 minutes for the next three hours, re-slice the drying batter in each tray into the rectangles of step 17.
19. Continue to dehydrate the batter until its water activity has been reduced below 0.60, and preferably below 0.40. The result is unmilled chia crackers.
20. Mill 0.5 oz. of crackers, and prepare a 6:1 slurry from 3 oz. of distilled water and 0.5 oz. of crackers. Measure the pH value of this slurry. This pH value is called $pH_f$. Then $\delta pH_{LA} = pH_o - pH_f$.
21. Then place the crackers of Step 19 in a refrigerated area in which the relative humidity is 0.65, and allow the crackers to rehydrate until their water activity is 0.65.

This rehydration step makes the crackers somewhat moister and easier to chew. The result is referred to as remoistened crackers. (But be careful here; if the relative humidity is allowed to rise above 65%, mold may form on the crackers.)

6.5.2.1.3 Method for Making Chia and Sprouted Wheat Crackers

This cracker contains both chia seed and the gluten-bearing ingredient, sprouted wheat. It is, therefore, a very sturdy product. 1.5*MAA of chia seed is used to prepare these crackers, and the CFA for these crackers is 0.61. The highest CFA for Applicant's early experimental batch of crackers was 0.5 which was considered such a failure that the highest CFA for any succeeding early batch was only 0.2. This method uses dehydrated sprouted wheat at step 2. The method for sprouting wheat is well known to those who are skilled in the art. After the wheat is sprouted (for about 18 hours), it is then dehydrated at a temperature of 104° F. (40° C.) by methods well known to those who are skilled in the art.

The Method for Making Chia and Sprouted Wheat Crackers Follows:

1. Reduce the relative humidity of the atmosphere in the Preparation Room (the closed room or area in which product preparation activities take place) to less than 40%.
2:. Mill 1 pound 5 ounces of certified organic or certified chemical-free dehydrated sprouted wheat.
3. Measure out the following ingredients:
   a. 1 pound 5 ounces of certified chemical-free sesame seed b. 2 pounds 1 ounce of certified chemical-free chia seed.
4. Pour 4 pounds 11 ounces of 104° F. (40° C.) water into a suitably sized round stainless steel or plastic container (the mixing container) which complies with FDA regulations.
5. Pour milled wheat sprouts into the mixing container and stir well.
6. Pour sesame seed into the mixing container and stir well.
7. While stirring vigorously, very slowly pour chia seed into the mixing container near its inside wall (no more than about 1/300 of an ounce of chia seed per revolution of the mixing paddle per square inch of the surface area of the mixture in the mixing container), and continue to stir vigorously for 5 minutes.
8. Allow the batter in the mixing container to set for 20 minutes before proceeding.
9. Place a 19 inch diameter pizza platter on a table.
10. Place the first or next circular dehydrator screen on the pizza platter.
11. Pour 4 pounds 11 ounces of batter onto the screen, and spread the batter evenly around on screen.
12. Lift the screen with the batter on it and place it onto the first or next dehydrator tray. Place another screen on top of the batter, and invert and fit another dehydrator tray on top of this dehydrator tray such that the center walls of the two trays interlock.
13. Flip this two-tray assembly, and remove top dehydrator tray and screen.
14. Place the lower dehydrator tray with the batter on it onto the dehydrator base unit. Place an empty dehydrator tray on top of the tray containing the batter. (This provides additional ventilation.)
15. Repeat steps 10–14 until all the batter in the mixing container has been placed on dehydrator trays on the dehydrator base unit. There should now be two trays of batter on the dehydrator base unit. Place the insulated dehydrator cover on the top tray to minimize loss of heat during the dehydration process. Set the rotary temperature selection dial to indicate a temperature of 104° F. (40° C.). Turn on the dehydrator.

An alternate to steps 8–15 above is given in §6.4.2, Method of Use of Despoked Trays and Screen-Forms. The chief advantage of this alternate method is it eliminates the tremendous effort required to spread the batter in step 11 above. The chief disadvantage of this alternate method is that it means one extra drying surface to be cleaned.)

16. Thirty minutes after step 15, slice each tray's drying batter into ¼ inch by 1 inch rectangles, and put the trays back on the dehydrator base unit. (Slicing the batter into very thin rectangles speeds drying and inhibits bacterial souring.)
17. Every 30 minutes for the next three hours, re-slice each tray's drying batter into the rectangles of step 16.
18. Continue to dehydrate the batter until its water activity has been reduced below 0.60, and preferably below 0.40. Then place this product in a refrigerated area in which the relative humidity is 0.65, and allow the product to rehydrate until its water activity is 0.65. This rehydration step makes the product somewhat moister and easier to chew. The result is referred to as remoistened crackers. (But be careful here; if the relative humidity is allowed to rise above 65%, mold may form on the product.)

6.5.2.1.4 Method for Making the Chia Vegetable Snack

The following method can be used for agglutinating a wide variety of foods from the vegetable kingdom. The term "foods from the vegetable kingdom" is meant to include any edible food of vegetarian origin and includes fruits, vegetables, both sprouted and unsprouted grains, both fruit and vegetable syrups, honey, tree syrups, and bee pollen. Therefore the only foods not within the contemplation of this invention are the flesh of animals, fish, birds, and insects, and inedible foods of vegetarian origin. According to *How to Dry Foods* by Deanna DeLong (HPBooks, A division of Price Stern Sloan, Inc., 360 N. Lacienega Blvd., Los Angeles, Calif. 90048, 1979), some of the suitable fruits for dehydration are apples, apricots, bananas, blueberries, cherries, citrus fruits, coconuts, cranberries, currants, dates, figs, grapes, melons, nectarines, papayas, peaches, pears, persimmons, pineapples, plums, prune plums, rhubarb, and strawberries. Some of the suitable vegetables for dehydration are artichokes, beets, broccoli, cabbages, carrots, garlic, horseradish, kohlrabi, mushrooms, okra, onions, parsley, parsnips, red and green peppers, chili peppers, potatoes, pumpkins, rutabagas, summer squash, sweet potatoes, tomatoes, turnips, yams, zucchini, and cured olives. So that the vegetables used will not significantly deteriorate during drying, the vegetables must be sliced into sections which are not larger than ½ inch on a side. Preferably, the vegetables should be sliced into sections which are not larger than ¼ inch on a side. Most preferably the vegetables used for Chia Vegetable Snacks should be sliced into even smaller pieces or shredded using the Presto SaladShooter in order to minimize drying time. For maximum nutritional value, it is further preferred that the batter prepared for these snacks be spread thinly upon dehydrator screens in order to minimize drying time. The method below illustrates snacks prepared with shredded carrots and broccoli, and the final product is very colorful: thin orange strips of carrot are interspersed with thin green strips of broccoli. Further, although these snacks are completely gluten-free, they are very sturdy and clearly demonstrate the ability of chia seed to agglutinate various vegetables. The CFA for this snack food is 1.00, thus further demonstrating chia seed's agglutinative powers.

The Method for Making the Chia Vegetable Snack is as Follows:

1. Reduce the relative humidity of the atmosphere in the Preparation Room (the closed room or area in which product preparation activities take place) to less than 40%.
2. Pour 24 ounces of distilled water into a suitably sized round stainless steel or plastic container (the mixing container) which complies with FDA regulations.
3. Assemble the Presto SaladShooter electric shredder/slicer with the shredder cone, and use it to shred 5 ounces of carrots and 5 ounces of broccoli stalks.
4. Measure out:
   (a) 1 pound of certified chemical-free chia seed
   (b) 1 ounce of dulse powder
5. Stir the dulse powder into the water in the mixing container. Add the shredded carrots and broccoli, and stir well.
6. While stirring vigorously, very slowly pour the chia seed into the mixing container near its inside wall (no more than about 1/300 of an ounce of chia seed per revolution of the mixing paddle per square inch of the surface area of the mixture in the mixing container), and stir vigorously for five minutes.
7. Let set for 15 minutes. (If less water is used at Step 2, this 15 minute wait can be reduced correspondingly, but the batter will be somewhat more difficult to spread at Step 11.)
8. Place a 19 inch diameter pizza platter on a table.
9. Place the first or next circular dehydrator screen on the pizza platter.

10. Pour the batter onto the circular screen.
11. Spread the batter evenly around on the screen, avoiding, of course, the screen's center hole.
12. Lift the screen with the batter on it and place it onto the first or next dehydrator tray. Place another screen on top of the batter, and invert and fit another dehydrator tray on top of the dehydrator tray containing the batter, such that the center walls of the two trays interlock.
13. Flip this two-tray assembly, and remove the top dehydrator tray and screen.
14. Place the lower dehydrator tray with the batter on the dehydrator base unit. Place an empty dehydrator tray on top of the tray containing the batter. (This provides additional ventilation.)
15. Place the insulated dehydrator cover on the top tray to minimize heat loss during the dehydration process.
16. Set the rotary temperature selection dial to indicate a temperature of 104° F. (40° C.). Turn on the dehydrator. An alternate to steps 7–16 above is given in §6.4.2, Method of Use of Despoked Trays and Screen-Forms. The chief advantage of this alternate method is it eliminates the tremendous effort required to spread the batter in step 11 above. The chief disadvantage of this alternate method is that it means one extra drying surface to be cleaned.)
17. Thirty minutes after step 16, slice the drying batter in each tray into ¼ inch by 1 inch rectangles, and put the trays back on the dehydrator base unit.
18. Every 30 minutes for the next three hours, re-slice the drying batter in each tray into the rectangles of step 17.
19. Continue to dehydrate the batter until its water activity has been reduced below 0.60, and preferably below 0.40. Then place this product in a refrigerated area in which " the relative humidity is 0.65, and allow the product to rehydrate until its water activity is 0.65. This rehydration step makes the product somewhat moister and easier to chew. The result is referred to as remoistened crackers. (But be careful here; if the relative humidity is allowed to rise above 65%, mold may form on the product.)

6.5.2.1.5 Method for Making Sweetened Chia Crackers

Remarkably, the addition of a sweet syrup to the batter results in a very strong, flexible cracker with the organoleptic properties of dried figs (soft yet crunchy, and cohesive). The chia seed either absorbs the sweet syrup or holds it very tightly bound to itself. In the newly made product, the taste of chia seed is quite noticeable, but as the product ages, it acquires a most delightful taste which, although it is impossible to describe, substantially masks the taste of the chia seed. Applicant has not determined an upper limit on the amount of sweet syrup that a given amount of chia seed can absorb or bind to itself. Large quantities of sweeteners such as the sweet syrups, however, are detrimental to one's health. The strength, flexibility, and durability of products made with chia seed and one of the sweet syrups very strongly suggest that this combination may have utility outside of the food area-perhaps as a building material in certain applications. The CFA of these crackers is 1.00.

It should be noted, however, that the more sweet syrup that is used in the batter, the more slowly the chia seeds will absorb water from the surrounding batter. If a considerable amount of water activity depressant is used, one might have to wait an hour or more for the chia to absorb sufficient water from the batter for the batter to be spread on screens without significant leakage through the screen apertures. Of course if one waits too long, it will be very difficult to spread the batter on the screens.

The Method for Making Sweetened Chia Crackers is as Follows:
1. Utilize a dehumidifier to reduce the relative humidity of the room in which the product will be made to less than 40%. (If the relative humidity climbs above about 65%, mold may form on the drying batter.)
2. Pour 1 lb. of Nickabood's Wild Desert Honey into a suitably sized round stainless steel or plastic container (the mixing container) which complies with FDA regulations.
3. Pour 1½ pounds of 104° F. (40° C.) distilled water into the mixing container and stir until all the honey is dissolved.
4. While stirring vigorously, very slowly pour 1 pound of certified chemical-free chia seed into the mixing container near its inside wall (no more than about 1/300 of an ounce of chia seed per revolution of the mixing paddle per square inch of the surface area of the mixture in the mixing container).
5. Continue to stir the batter vigorously for five minutes.
6. Allow the batter to set for 30 minutes. (If less water is used at Step 3, this 30 minute wait can be reduced correspondingly, but the batter will be somewhat harder to spread at Step 10.)
7. Place a 19 inch diameter pizza platter on a table.
8. Place a circular dehydrator screen on a pizza platter.
9. Pour the batter onto the screen.
10. Spread batter evenly around on the screen, avoiding, of course, the screen's center hole.
11. Lift the screen with its batter, and place it on a dehydrator tray. Place another screen on top of the batter, and invert and fit another dehydrator tray on the first dehydrator tray such that the two trays' center walls interlock.
12. Flip this two-tray assembly, and remove the top dehydrator tray and screen.
13. Place the lower dehydrator tray with the batter on the dehydrator base unit. Place an empty dehydrator tray on top of the tray containing the batter. (This provides additional ventilation.) Place the insulated dehydrator cover on the top tray to minimize loss of heat from the dehydrator.
14. Set the rotary temperature selection dial of the dehydrator to indicate a temperature of 104° F. (40° C.).

Turn on the dehydrator. (An alternate to steps 6–14 above is given in §6.4.2, Method of Use of Despoked Trays and Screen-Forms. The chief advantage of this alternate method is it eliminates the tremendous effort required to spread the batter in step 10 above. The chief disadvantage of this alternate method is that it means one extra drying surface to be cleaned.)

15. Thirty minutes after step 14, slice the drying batter into ¼ inch by 1 inch rectangles, and put the tray back on the dehydrator base unit. (It is essential that these rectangles be no thicker than ¼ inch; cracker batter which contains both chia seed and a sweetener such as honey dries very slowly to a water activity less than 0.60. If the cracker batter dries too slowly yeast and mold formation is encouraged.)
16. Every 30 minutes for the next three hours, re-slice the drying batter into the rectangles of step 15.
17. When the water activity of the drying batter drops to about 0.70, the batter should now be dry enough that the screen on which it rests can be removed without tearing the batter. To do this, proceed as follows: Remove the insulated dehydrator cover. Invert and fit another dehydrator tray on the dehydrator tray containing the batter such that the two trays' center walls interlock.

Flip this two-tray assembly, and remove the top dehydrator tray and screen. Place the lower dehydrator tray with the batter back on the dehydrator base unit. Replace the insulated dehydrator cover. Removing the screen will accelerate the drying of the batter.

18. Continue to dehydrate the batter until its water activity has been reduced below 0.60, and preferably below 0.40. Then place these resultant crackers in a refrigerated area in which the relative humidity is 0.65, and allow the crackers to rehydrate until their water activity is 0.65. This rehydration step makes the crackers somewhat moister and easier to chew. The result is referred to as remoistened crackers. (But be careful here; if the relative humidity is allowed to rise above 65%, mold may form on the crackers.)
19. Determine the cross-sectional area and tensile strength of a typical piece of these sweetened chia crackers.

6.5.2.1.6 Method for Making Carob Flavored Chia Crackers

It has been found that in products containing chia seed, honey, and, perhaps, a fruit syrup, the taste of the chia seed is somewhat noticeable (unless the product has been allowed to age for a few weeks as noted previously). The use of carob completely and effectively masks the chia seed taste resulting in very delicious products, with the organoleptic properties of dried figs (soft yet crunchy, and cohesive).

The Method for Making Carob Flavored Chia Crackers is as Follows:

1. Utilize a dehumidifier to reduce the relative humidity of the room in which the product will be made to less than 40%. (If the relative humidity climbs above about 65%, mold may form on the drying batter.)
2. Measure out the following ingredients:
    a. 1.5 pounds of carob powder (Applicant favors the use of raw certified chemical free carob powder.)
    b. 1.5 pounds of certified chemical-free chia seed
3. Pour 1.5 pounds of honey, 1 pound of apple concentrate, and 0.5 pounds of grape concentrate into a suitably sized round stainless steel or plastic container (the mixing container) which complies with FDA regulations. (With the honey and fruit syrup ingredients in the ratio of 3 to 2 to 1, the final product tastes like a most delicious dried fig product. The seeds in dried figs are very crunchy; the whole chia seed in the end product is somewhat softer and less crunchy than the seeds in figs; nevertheless, the organoleptic properties of the two are very similar.)
4. Pour 2 pounds 2.5 ounces of 104° F. (40° C.) distilled water into the mixing container and stir until the honey, apple, and grape concentrates are dissolved.
5. Pour the carob powder into the container and stir well.
6. While stirring vigorously, very slowly pour the chia seed into the mixing container near its inside wall (no more than about 1/300 of an ounce of chia seed per revolution of the mixing paddle per square inch of the surface area of the mixture in the mixing container), and continue to stir vigorously for five minutes.
7. Allow the batter to set for 30 minutes. (If less water is used at Step 4, this 30 minute wait can be reduced correspondingly, but the batter will be somewhat harder to spread at Step 11.)
8. Place a 19 inch diameter pizza platter on a table.
9. Place the first or next circular dehydrator screen on the pizza platter.
10. Pour 4 pounds of batter onto the screen.
11. Spread batter evenly around on the screen, avoiding, of course, the screen's center hole.
12. Lift the screen with the batter on it, and place it onto the first or next dehydrator tray. Place another screen on top of the batter, and invert and fit another dehydrator tray on top of the dehydrator tray containing the batter such that the center walls of the two trays interlock.
13. Flip this two tray assembly, and remove the top dehydrator tray and screen.
14. Place the lower dehydrator tray with the batter on the dehydrator base unit. Place an empty dehydrator tray on top of the tray containing the batter. (This provides additional ventilation.)
15. Repeat steps 9–14 until all of the batter has been placed on dehydrator trays, and the trays have been stacked on the dehydrator base unit. This procedure should yield two trays of batter.
16. Place the insulated dehydrator cover on the top tray to minimize loss of heat during the dehydration process.
17. Set the rotary temperature selection dial to indicate a temperature of 104° F. (40° C.). Turn on the dehydrator. (An alternate to steps 7–17 above is given in §6.4.2, Method of Use of Despoked Trays and Screen-Forms. The chief advantage of this alternate method is it eliminates the tremendous effort required to spread the batter in step 11 above. The chief disadvantage of this alternate method is that it means one extra drying surface to be cleaned.)
18. Thirty minutes after step 17, slice the drying batter in each dehydrator tray into ¼ inch by 1 inch rectangles, and put the trays back on the dehydrator base unit. (It is essential that these rectangles be no thicker than ¼ inch; cracker batter which contains both chia seed and a sweetener such as honey dries very slowly to a water activity less than 0.60. If the cracker batter dries too slowly, yeast and mold formation is encouraged.)
19. Every 30 minutes for the next three hours, re-slice the drying batter in each dehydrator tray into the rectangles of step 18.
20. When the water activity of the drying batter drops to about 0.70, the batter should now be dry enough that the screens on which it rests can be removed without tearing the batter. To do this, proceed as follows: Remove the insulated dehydrator cover. Invert and fit another dehydrator tray on the dehydrator tray containing the batter such that the two trays' center walls interlock. Flip this two-tray assembly, and remove the top dehydrator tray and screen. Place the lower dehydrator tray with the batter back on the dehydrator base unit. Repeat this for each tray of drying batter. Then replace the insulated dehydrator cover. Removing the screens will accelerate the drying of the batter.
21. Continue to dehydrate the batter until its water activity has been reduced below 0.60, and preferably below 0.40. Then place these resultant crackers in a refrigerated area in which the relative humidity is 0.65, and allow the crackers to rehydrate until their water activity is 0.65. This rehydration step makes the crackers somewhat moister and easier to chew. The result is referred to as remoistened crackers. (But be careful here; if the relative humidity is allowed to rise above 65%, mold may form on the crackers.)
22. Determine the cross-sectional area and tensile strength of a typical piece of Carob Flavored Chia Crackers.

6.5.2.1.7 Method for Making the Chia Fruit Snack

The following method can be used for agglutinating a wide variety of fruits. According to How to Dry Foods by Deanna DeLong (HPBooks, A division of Price Stern Sloan, Inc., 360 N. LaCienega Blvd., Los Angeles, Calif. 90048, 1979), some of the more suitable fruits for dehydration are apples, apricots, bananas, blueberries, cherries, citrus fruits, coconuts, cranberries, currants, dates, figs, grapes, melons, nectarines, papayas, peaches, pears, persimmons, pineapples, plums, prune plums, rhubarb, and strawberries. So that the fruits used will not significantly deteriorate during drying, the fruits must be sliced into sections which are no larger than ½ inch on a side. Preferably, the fruits should be sliced into sections which are not larger than ¼ inch on a side. Most preferably the fruits used for Chia Fruit Snacks should be sliced into even smaller pieces or shredded using the Presto SaladShooter in order to minimize drying time. For maximum nutritional value, it is further preferred that the batter prepared for these snacks be spread thinly upon dehydrator screens in order to minimize drying time. The following snacks are prepared with shredded apples and pears and diced plums. The CFA for this snack food is 1.00, thus demonstrating chia seed's agglutinative powers.

The Steps of this Method are as Follows:

1. Utilize a dehumidifier to reduce the relative humidity of the room in which the product will be made to less than 40%. (If the relative humidity climbs above about 65%, mold may form on the drying batter.)
2. Pour 12 oz. of honey into a suitably sized round stainless steel or plastic container (the mixing container) which complies with FDA regulations.
3. Pour 18 oz. of 104° F. (40° C.) distilled water into the mixing container and stir until the honey is dissolved.
4. Assemble the Presto SaladShooter electric shredder/slicer with the shredder cone, and use it to shred 2 oz. of apples, and 2 oz. of pears (omitting any inedible skins or seeds). Dice 2 oz. of plums (omitting the inedible skin and pits) into quarter inch cubes. Stir the shredded apples and pears and the diced plums into the mixing container.
5. While stirring vigorously, very slowly pour 12 oz. of certified chemical-free chia seed into the mixing container near its inside wall (no more than about 1/300 of an ounce of chia seed per revolution of the mixing paddle per square inch of the surface area of the mixture in the mixing container), and continue to stir vigorously for five minutes.
6. Allow the batter to set for 30 minutes. (If less water is used at Step 4, this 30 minute wait can be reduced correspondingly, but the batter will be somewhat harder to spread at Step 10.)
7. Place a 19 inch diameter pizza platter on a table.
8. Place a circular dehydrator screen on a pizza platter.
9. Pour the batter onto the screen.
10. Spread batter evenly around on the screen, avoiding, of course, the screen's center hole.
11. Lift the screen with its batter, and place it on a dehydrator tray. Place another screen on top of the batter, and invert and fit another dehydrator tray on the first dehydrator tray such that the two trays' center walls interlock.
12. Flip this two-tray assembly, and remove the top dehydrator tray and screen.
13. Place the lower dehydrator tray with the batter on the dehydrator base unit. Place an empty dehydrator tray on top of the tray containing the batter. (This provides additional ventilation.) Place the insulated dehydrator cover on the top tray to minimize loss of heat from the dehydrator.
14. Set the rotary temperature selection dial of the dehydrator to indicate a temperature of 104° F. (40° C.). Turn on the dehydrator.
(An alternate to steps 6–14 above is given in §6.4.2, Method of Use of Despoked Trays and Screen-Forms. The chief advantage of this alternate method is it eliminates the tremendous effort required to spread the batter in step 10 above. The chief disadvantage of this alternate method is that it means one extra drying surface to be cleaned.)
15. Thirty minutes after step 14, slice the drying batter into ¼ inch by 1 inch rectangles, and put the tray back on the dehydrator base unit. (It is essential that these rectangles be no thicker than ¼ inch; cracker batter which contains both chia seed and a sweetener such as honey dries very slowly to a water activity less than 0.60. If the cracker batter dries too slowly, yeast and mold formation is encouraged.)
16. Every 30 minutes for the next three hours, re-slice the drying batter into the rectangles of step 15.
17. Continue to dehydrate the batter until its water activity has been reduced below 0.60, and preferably below 0.40.
18. Place the tray containing the Chia Fruit Snacks in a frost-free refrigerator for several hours to allow the honey in the product to fully congeal. Once the honey congeals in the cold of the refrigerator, the screens can be more easily pulled away from the batter. Preferably, these crackers are left in a refrigerator whose relative humidity is maintained at 0.65, until the crackers have rehydrated to a water activity of 0.65. This rehydration step makes the crackers somewhat moister and easier to chew. The result is referred to as remoistened crackers. (But be careful here; if the relative humidity is allowed to rise above 65%, mold may form on the crackers.)

6.5.2.2 Chia Crackers Prepared by the Osmotic Pressure Differential Establishment Method of Water Activity Reduction 6.5.2.2.1 Method for Making Honey-Sweetened Chia Crackers The addition of a sweet syrup to the batter results in very strong, flexible crackers with the organoleptic properties of dried figs (soft yet crunchy, and cohesive). In the following method, chia seed either absorbs the honey or holds it very tightly bound to itself. The CFA of these crackers is 1.00.

It should be noted that the more sweet syrup that is used in the batter, the more slowly the chia seeds will absorb water from the surrounding batter. If a considerable amount of water activity depressant is used, one might have to wait an hour or more for the chia to absorb sufficient water from the batter for the batter to be spread on screens without significant leakage through the screen apertures. Of course if one waits too long, it will be very difficult to spread the batter on the screens.

1. Pour 12 ounces of 104° F. (40° C.) distilled water into a suitably sized round stainless steel or plastic container (the mixing container) which complies with FDA regulations.
2. While stirring vigorously, very slowly pour 6 ounces of certified chemical-free chia seed into the mixing container near its inside wall (no more than about 1/300 of an ounce of chia seed per revolution of the mixing paddle per square inch of the surface area of the mixture in the mixing container), and stir vigorously for five minutes. This vigorous stirring further reduces the possibility of the chia seed clumping together, and, consequently, not being evenly wet by water.
3. Spread this chia batter onto a flat level clean surface so that the batter is no more than ¼ inch thick.
4. Allow this chia seed and water batter to set for 30 minutes in order to allow the chia seed to absorb water from the batter.
5. Slice this batter into two inch squares.
6. Immerse these squares into pure undiluted honey, and let set (in the honey) for 30 minutes to reduce the water activity of these pieces.
7. Remove these crackers and immerse them into new fresh honey, again letting these crackers set in the honey for 30 minutes.
8. Repeat step 7 until the water activity of the crackers has been reduced below 0.60, and preferably below 0.40.

Then place this product in a refrigerated area in which the relative humidity is 0.65, and allow the product to rehydrate until its water activity is 0.65. This rehydration step makes the product somewhat moister and easier to chew. (But be careful here; if the relative humidity is allowed to rise above 65%, mold may form on the product.)

9. Mill the crackers and determine the pH value of a slurry consisting of 3.0 ounces of distilled water and 0.5 ounces of the milled cracker.

6.5.2.2.2 Method for Making Carob Flavored Chia Crackers

It has been found that in products containing chia seed, honey, and, perhaps, a fruit syrup, the taste of the chia seed is somewhat noticeable (unless the product has been allowed to age for a few weeks as noted previously). The use of carob completely and effectively masks the chia seed taste resulting in very delicious products, with the organoleptic properties of dried figs (soft yet crunchy, and cohesive).

1. Measure out the following ingredients:
   a. 6 ounces of carob powder (Applicant prefers the use of raw organic certified chemical free carob powder.)
   b. 6 ounces of certified chemical-free chia seed
2. Pour 6 ounces of honey, 4 ounces of apple concentrate, and 2 ounces of grape concentrate into a suitably sized round stainless steel or plastic container (the mixing container) which complies with FDA regulations. (With the honey and fruit syrup ingredients in the ratio of 6 to 4 to 2, the final product tastes like a most delicious dried fig product. The seeds in dried figs are very crunchy; the whole chia seed in the end product is somewhat softer and less crunchy than the seeds in figs, nevertheless, the organoleptic properties of the two are very similar.)
3. Pour 9 ounces of 104° F. (40° C.) distilled water into the mixing container and stir well.
4. Pour the carob powder into the container, and stir well.
5. While stirring vigorously, very slowly pour the chia seed into the mixing container near its inside wall (no more than about 1/300 of an ounce of chia seed per revolution of the mixing paddle per square inch of the surface area of the mixture in the mixing container), and continue to stir vigorously for five minutes.
6. Spread this chia batter onto a flat level clean surface so that the batter is no more than ¼ inch thick.
7. Allow the batter to set for 30 minutes. (If less water is used at Step 3, this 30 minute wait can be reduced correspondingly.)
8. Slice this batter into two inch squares.
9. Immerse these squares into pure undiluted honey, and let set (in the honey) for 30 minutes to reduce the water activity of these squares.
10. Remove these squares and immerse them into new fresh honey, again letting these squares set in the honey for 30 minutes.
11. Repeat step 10 until the water activity of the squares has been reduced below 0.60, and preferably below 0.40. Then place this product in a refrigerated area in which the relative humidity is 0.65, and allow the product to rehydrate until its water activity is 0.65. This rehydration step makes the product somewhat moister and easier to chew. (But be careful here; if the relative humidity is allowed to rise above 65%, mold may form on the product.)
12. Mill the squares and determine the pH value of a slurry consisting of 3.0 ounces of distilled water and 0.5 ounces of the milled squares.

6.5.2.2.3 Method for Making Chia and Sprouted Wheat Crackers

This cracker contains both chia seed and the gluten-bearing ingredient, sprouted wheat. It is, therefore, a very sturdy product. Slightly more than 1.5*MAA of chia seed is used to prepare these crackers, and the CFA for these crackers is 0.61. This method uses dehydrated sprouted wheat at step 2. The method for sprouting wheat is well known to those who are skilled in the art. After the wheat is sprouted (for about 18 hours), it is then dehydrated at a temperature of 104° F. (40° C.) by methods well known to those who are skilled in the art.

The Steps of this Method are as Follows:

1. Mill 3.8 ounces of certified chemical-free dehydrated sprouted wheat.
2. Measure out the following ingredients:
   a. 3.8 ounces of certified chemical-free sesame seed
   b. 6 ounces of certified chemical-free chia seed.
3. Pour 13.6 ounces of 104° F. (40° C.) water into a suitably sized round stainless steel or plastic container (the mixing container) which complies with FDA regulations.
4. Pour the milled wheat sprouts into the mixing container and stir well.
5. Pour the sesame seed into the mixing container and stir well.
6. While stirring vigorously, very slowly the pour chia seed into the mixing container near its inside wall (no more than about 1/300 of an ounce of chia seed per revolution of the mixing paddle per square inch of the surface area of the mixture in the mixing container).
7. Continue to stir the batter vigorously for 5 minutes.
8. Spread this chia seed batter onto a flat level clean surface so that the batter is no more than ¼ inch thick.
9. Allow the batter to set for 15 minutes before proceeding.
10. Slice this batter into two inch squares.
11. Immerse these squares into pure undiluted honey, and allow them to set (in the honey) for 30 minutes to reduce the water activity of these pieces.
12. Remove these squares and immerse them into new fresh honey, again allowing these squares to set in the honey for 30 minutes.
13. Repeat step 12 until the water activity of the squares has been reduced below 0.60, and preferably below 0.40. Then place this product in a refrigerated area in which the relative humidity is 0.65, and allow the product to rehydrate until its water activity is 0.65. This rehydration step makes the product somewhat moister and easier to chew. (But be careful here; if the relative humidity is allowed to rise above 65%, mold may form on the product.)
14. Mill the squares and determine the pH value of a slurry consisting of 3.0 ounces of distilled water and 0.5 ounces of the milled squares.

6.5.2.2.4 Method of Extracting an Agglutinant from Whole Chia Seeds.

1. Pour 20 parts of water into the mixing container for each part of chia seed to be used at step 2.
2. While stirring vigorously, very slowly pour one part of chia seed into the mixing container near its inside wall (no more than about 1/300 of an ounce of chia seed per revolution of the mixing paddle per square inch of the surface area of the mixture in the mixing container).
3. Continue to stir the batter vigorously for 5 minutes to keep the chia seed from clumping.
4. Let this mixture set for about an hour to give the seed coats of the chia seeds enough time to thoroughly dissolve in the water.
5. Pour a portion of chia seed into a kitchen strainer with smaller openings than the size of a chia seed, and use a suitably shaped object (such as a bowl or any round object of suitable size) to force the chia seed against the strainer openings. A slimy liquid will be forced through the strainer opening.

6. Pour this slimy liquid onto a dehydrator solid sheet and dehydrate until dry. The result will be a thin transparent film of chia agglutinant on the dehydrator solid sheet.
7. Scrape this film off the solid sheet, and keep tightly sealed in a cool, dry place. This film is the chia agglutinant. Since this agglutinant does not contain chia seeds, it can be said that any product made with this agglutinant is chia seed-free.

6.5.2.2.5 Method of Using the Agglutinant Extracted from Whole Chia Seeds to Agglutinate a Food Product.

Applicant used the agglutinant extracted from whole chia seeds to agglutinate a carob-water mixture, but this agglutinant can be used to agglutinate virtually any food product. The following procedure shows how the agglutinant can be used to agglutinate a carob-water mixture.

1. Stir 3 ounces of carob powder into 4 ounces a mixture of water and chia agglutinant. Trial and error will have to be used to determine the best ratio of chia agglutinant to water to obtain the desired degree of hardness of the end product. (As mentioned in §6.5.1.1 Circumstances of Conception, Applicant stirred 8 ounces of chia seed into 20 pints of water, separated out 9 ounces of chia agglutinant, and used 4 of these ounces to make an agglutinated carob confection.)
2. Dehydrate the resultant mixture at a temperature of 105° F. (40.6 C) until its water activity is less than 0.60. Since the resultant product does not contain chia seeds, it can be said that this resultant product is chia seed-free.

6.5.2.2.6 Method of Making Chia Scramblers

All of the above methods take from 48 to 60 hours to complete. There is a need for a method that from start to finish is complete in 24 hours. The following method for making Chia Scramblers is unique in that a complete batch of chia based crackers is complete in about 18 hours. This method uses dehydrated sprouted wheat and millet at step 6. The methods for sprouting wheat and millet are well known to those who are skilled in the art. After the wheat and millet are sprouted (for about 18 hours), the sprouts are then dehydrated at a temperature of 104° F. (40° C.) by methods well known to those who are skilled in the art.

The Steps of this Method are as Follows:

1. Utilize a dehumidifier to reduce the relative humidity of the room in which the product will be made to less than 40%. (If the relative humidity climbs above about 65%, mold may form on the drying batter.)
2. Heat eight pounds of honey at a temperature of 115 F (46 C) for 30 minutes to reduce its viscosity. Measure out the following ingredients:
   a. 6 pounds of certified chemical-free carob powder
   b. 10 pounds of chia seed
   c. 3 pounds of dehydrated sprouted wheat
   d. 3 pounds of dehydrated sprouted millet
3. Pour the 8 pounds of honey from step 2 into a suitably sized round stainless steel or plastic container (the mixing container) which complies with FDA regulations.
4. Pour 10 pounds of 104° F. (40° C.) distilled water into the mixing container and stir until the honey is dissolved. By using only 10 pounds of water here, a very thick batter is made, and this batter has little water in comparison to the amount of chia seed being used. The ten pounds of chia seed being used in this method will normally absorb twelve times as much water as is being used. With this method the weight of the water used can be equal to or slightly less than the weight of the chia seed used. Thus there is not much water to remove during the dehydration step, and the batter can be very quickly dehydrated to a water activity of less than 0.66.
5. Mix the 3 pounds of dehydrated sprouted wheat with the 3 pounds of dehydrated sprouted millet.
6. Mill the mixture of dehydrated sprouted wheat and millet.
7. Pour the milled sprouts into the mixing container, and stir well.
8. Pour the carob powder into the mixing container and stir well.
9. While stirring vigorously, very slowly pour the chia seed into the mixing container near its inside wall (no more than about 1/300 of an ounce of chia seed per revolution of the mixing paddle per square inch of the surface area of the mixture in the mixing container), and continue to stir vigorously for another five minutes. This mixture constitutes the cracker batter.
10. Allow this batter to set until it is sufficiently stiff (about ten minutes) that it can be easily spread but without running to any degree. During this time, the chia seed slowly absorbs water from the batter making the batter very firm.
11. Place the batter on a large smooth hard clean cutting surface, and spread it to a thickness of about ¼ inch.
12. Slice the batter into approximately ½ inch by two inch rectangles. The shortest dimension of a rectangle should not be larger than ½ inch so that the center of the rectangle will dry quickly.
13. Place a circular dehydrator screen in a dehydrator tray.
14. Place a sufficient number of ½ inch by two inch rectangles on the circular screen in the dehydrator tray leaving at least 1/16th of an inch between pieces (for proper ventilation) until the rectangles are one level deep in the tray.
15. Place this dehydrator tray on the dehydrator base unit. (If this is the second or beyond dehydrator tray to be loaded with batter slices then there is already at least one tray on the dehydrator base unit. In this case, stack this tray on top of the last tray placed thus forming a stack of trays on the dehydrator base unit.)
16. Repeat steps 13–15 until all of the batter has been placed on dehydrator trays. Place the insulated dehydrator cover on the top tray to minimize heat loss during the dehydration process.
17. Set the rotary temperature selection dial of the dehydrator base unit to indicate a temperature of 104° F. (40° C.). Turn on the dehydrator.
18. About 16 hours after step 17, the water activity of the ½ by 2 inch rectangles should be less than 0.65, and the rectangles can be refrigerated till ready to be used or packed.
19. Then place these resultant crackers in a refrigerated area in which the relative humidity is 0.65, and allow the crackers to rehydrate until their water activity is 0.65. This rehydration step makes the crackers somewhat moister and easier to chew. The result is referred to as remoistened crackers. (But be careful here; if the relative humidity is allowed to rise above 65%, mold may form on the crackers.)

6.6 VERIFICATION OF PRODUCT VITALITY

In order to demonstrate that Applicant's products have not been processed at such temperatures and times which would damage the vitality of my products, he presents a method for determining what he calls the Thermal Damage Coefficient, D, of a product. During the making of a food product, it is subjected to various temperatures for various lengths of time. A plot could be made of temperature versus time which would show how temperature varied over time during the processing of the food product. Essentially, the Thermal Damage Coefficient of a product is a measure of the degree to which the seeds in that product would fail to sprout or have their sprouting capability diminished due to thermal damage if, prior to sprouting them, they had been held in water whose temperature variations over time were the same as occurred in the process which produced the food product. For a completely undamaged product, D is zero. For a completely damaged product, D is one. A product with a Thermal Damage Coefficient near zero means that the product has not been significantly affected by heat, and, unless it was subjected to other destructive influences, it still possesses the bulk of its valuable nutrients. A product with a Thermal Damage Coefficient near 1.0 has had most of its valuable nutrients damaged or destroyed by heat. It is the better part of wisdom to avoid such products.

For those food products whose preparation involved holding them at a substantially constant elevated temperature (i.e., in excess of 30° C.) for a continuous period of time, the Thermal Damage Coefficient can be determined as follows:

(1) Let $R_t$ be the length of the time period during which the product was exposed to an elevated temperature (i.e., a temperature in excess of 30° C.). (Temperatures below 30° C. are not known to damage any of the known nutrients in food.)

(2) Let $T_e$ be the elevated temperature to which the product was subjected.

(3) Compute Elevated Temperature Soak Time, $R_e$, as the lesser of $R_t$ and 8 hours.

(4) Compute Room Temperature Soak Time: $R_o = 8$ hours $- R_e$ (5) Carefully select $n_t$ ($n_t \geq 40$) plump seeds which are not damaged, discolored, or shriveled. Soak these seeds in distilled water in a sealed thermally conductive container for $R_e$ hours at a temperature of $T_e$. (The container is sealed to prevent evaporation and resultant cooling.)

(6) At the end of $R_e$ hours, continue to soak the seeds for a further $R_o$ hours at a temperature of 20–30° C. (i.e., room temperature).

(7) Between the start of step 5 and the end of step 6, the seeds will have soaked for a total of 8 hours.

(8) Carefully select a second lot of $n_t$ (same as the $n_t$ of step 5) plump seeds from the same batch as was used in step 5 which are not damaged, discolored, or shriveled. Soak these seeds in distilled water in a sealed thermally conductive container for eight hours at a temperature of 30° C. (Again, the container is sealed to prevent evaporation and resultant cooling.)

(9) Sprout the seeds of step 7 for 48 hours. Let $n_e$ be the number of seeds out of $n_t$ which sprout.

(10) Sprout the seeds of step 8 for 48 hours. Let $n_r$ be the number of seeds out of $n_t$ which sprout.

(11) Compute D for this product as follows:

$$D = (1/n_r)*(n_r - n_e) \pm 2/n_t$$

(By definition, a product which was never subjected to a temperature greater than 30° C. has a Thermal Damage Coefficient of 0.)

6.7 EXAMPLES

A number of examples of products made by the above methods will now be given. Please note that the pH readings given in these examples were obtained with an analog pH meter with a resolution of 0.1 pH. In those cases where the meter needle fell between two tenths markings, Applicant has attempted to give his best estimation of the reading.

In each of the Examples of this section, the value of $pH_f$ (pH final) is an actual measured value. Unless indicated otherwise, however, the value of $pH_o$ (pH initial) is an estimated value based on Applicant's previous work with these materials. Such estimated values will be reasonably close to actual measured values inasmuch as the pH of unsoured seeds and unsoured sprouted grains ranges from about 6.0 to about 6.5, depending on the type of seed or grain.

Using the methods described in the "Description of Preferred Method to Manufacture Invention" section of this application, the products of Applicant's invention were made. In order that one may more easily correlate the results he obtained with the steps of his method, Applicant lists the steps that had measurable outputs and the results obtained for those steps:

Example 1

Plain Chia Crackers were made by the method shown in §6.5.2.1.1, "Method for Plain Chia Crackers". The cross-sectional area and tensile strength of a typical cracker were measured. Then the pH of a slurry made from milled crackers and distilled water was measured. This slurry was then dehydrated in order to investigate the degree of souring which can be expected when crackers are made with milled chia seed instead of whole chia seed. The resultant dried product was milled, and a slurry consisting of 1 part milled product and 6 parts distilled water was prepared. The pH value of this slurry was then measured. The results of these measurements are shown below.

| Step | Results Obtained |
| --- | --- |
| 4 | $pH_O$ (actual) = 6.5. |
| 16 | Cross-sectional area: 0.397 sq. in. It required a force of 150 ounces to pull the cracker apart. Hence the tensile strength of this piece is 377.8 oz. per sq. inch. |
| 17 | $pH_f$ = 6.5. Thus, $\delta pH_{LA}$ = 6.5 − 6.5 = 0. |
| 18 | $pH_f$ = 5.16. Thus, $\delta pH_{LA}$ = 6.5 − 5.16 = 1.34. |

Although these crackers are completely gluten-free, it took over 9 pounds of force to pull them apart. Remarkably, the tensile strength of these plain chia crackers is 377.8/303.1 = 1.24 times greater than the tensile strength of Nabisco's Low Salt Triscuit® Whole Wheat Wafers. (Please see Example 4 below.)

Example 2

Honey-Sweetened Chia Crackers were made by the method shown in §6.5.2.1.5, "Method for Making Honey or Syrup-Sweetened Chia Crackers". The cross-sectional area and tensile strength of a typical cracker were measured and the results are shown below.

Step Results Obtained

19 Cross-sectional area: 0.279 square inches. It required a force of 158 ounces to pull the cracker in two. Hence, the tensile strength of this piece is 566.3 oz. per sq. inch.

Example 3

Carob Flavored Chia Crackers were made by the method shown in §6.5.2.1.6, "Method for Carob Flavored Chia Crackers". The cross-sectional area and tensile strength of a typical cracker were measured and the results are shown below.

Step Results Obtained

22 Cross-sectional area: 0.216 square inches. It required a force of 139 ounces to pull the cracker in two. Hence, the tensile strength of this piece is 643.5 oz. per sq. inch.

Example 4

Rice crackers were made by the method of Baker shown in the Summary of Invention, Objects and Advantages Section of this application in order to investigate the tensile strength and pH value of crackers made by the closest known background art method. The crackers developed large cracks during the dehydration process strongly suggesting that the amount of ground chia seed used was insufficient to bind together the gluten-free ground rice sprouts therein. One cracker with a cross-sectional area of 0.570 square inches withstood 6 ounces of force before breaking. The tensile strength of this piece is therefore only 10.53 ounces per square inch. Another piece with a cross-sectional area of 0.279 square inches withstood 10 ounces of force before breaking. The tensile strength of this piece is therefore 35.84 ounces per square inch. Due to the large cracks in the product, widely divergent measurements are to be expected. As a rough measure of chewability, a new Quikut Stainless Steel Knife (U.S. Pat. No. 2,973,578, assigned to Quikut Division of the Scott & Fetzer Co., Fremont, Ohio, 43240) was used to slice the cracker, and the force needed to slice the cracker was measured. It took between 7 and 9 pounds of force to slice the various crackers made by the method of Baker. A slurry was then prepared consisting of 0.5 ounces of milled rice cracker and 3.0 ounces of distilled water. The pH value of this slurry was 4.66.

It was then decided to select a widely known reference cracker for comparison purposes. Nabisco's Low Salt Triscuit® Whole Wheat Wafers, being popular among those with an above-average concern for health, was selected. The ingredients are: whole wheat, partially hydrogenated soybean oil, and salt. A TriscuitR cracker with a cross-sectional area of 0.254 square inches withstood a stretching force of 77 ounces before breaking. The tensile strength of this piece is therefore 303.1 ounces per square inch. And it took 146 ounces (=9 pounds 2 oz.) of force to slice this cracker using the Quikut knife. A slurry was made from 0.5 ounces of ground up Low Salt Triscuit® Whole Wheat Wafers and 3.0 ounces of water. The pH value of this slurry was measured and was found to be 6.20. Inasmuch as these crackers were prepared at a high temperature, no souring was expected.

Next, rice crackers were made by the methods of this application. No cracks at all developed in the crackers as they were dehydrating, suggesting that the amount of whole chia seed used was adequate. A cracker with a cross-sectional area of 0.243 square inches withstood 14 ounces of force before breaking. The tensile strength of this piece is therefore 57.61 ounces per square inch. As a rough measure of chewability, a new Quikut Stainless Steel Knife was used to slice the cracker, and the force needed to slice the cracker was measured. It took about 14 pounds of force to slice the various crackers made by Applicant's method. A slurry was then prepared consisting of 0.5 ounces of Applicant's milled rice crackers (0.35 inches thick) and 3.0 ounces of distilled water. The pH value of this slurry was 5.0. The pH of a very thick cracker (0.93 inches thick) was also measured and was found to be 4.88. (The extra thickness lengthens drying time and thus the time to reduce water activity below 0.60, thus providing extra time for bacterial souring to occur.)

6.8 THERMAL DAMAGE COEFFICIENT COMPARISONS

The Thermal Damage Coefficient of Applicant's products will now be compared with the Thermal Damage Coefficient of a product whose process includes dehydration at 125° F. (52° C.) for eight hours. It will be shown that the ingredients in Applicant's product have not had their vitality damaged by the temperatures and times of the process which made the product whereas products prepared at 125° F. (52° C.) have had their vitality damaged. The Relative Numbers method was used to compute the Thermal Damage Coefficient of Applicant's products as follows:

(1) During their processing, these products were exposed to the temperature of 104° F. (40° C.) for periods of time in excess of 8 hours. (Thus, $R_t$ is greater than 8 hours.)
(2) Therefore the elevated temperature of exposure, $T_e$, is 104° F. (40° C.).
(3) Elevated Temperature Soak Time, $R_o$, is 8 hours.
(4) Room Temperature Soak Time, $R_o$,=8 hours–$R_e$=0.
(5) 40 chia seeds were soaked in distilled water in a sealed container (to prevent evaporation) for 8 hours at a temperature of 104° F. (40° C.).
(6) A second lot of 40 seeds from the same batch of chia seed was soaked for eight hours at 30° C.
(7) The seeds of step 5 were sprouted for 48 hours. 29 of the 40 seeds sprouted. Therefore, $n_e$=29.
(8) The seeds of step 6 were sprouted for 48 hours. 29 of the 40 seeds sprouted. Therefore, $n_r$=29.
(9) D was computed for this product as follows:

$$D=(1/n_r)^*(n_r-n_e)\pm 2/n_t=0.00\pm 0.05=0.00 \text{ to } 0.05.$$

The Relative Numbers method was used to compute the Thermal Damage Coefficient of a product whose process included dehydration for 8 hours at 125° F. (52° C.) as follows:

(1) The elevated temperature of exposure, $T_e$, is 125° F. (52° C.).
(2) Elevated Temperature Soak Time, $R_e$, is 8 hours.
(3) Room Temperature Soak Time, $R_o$,=8 hours–$R_e$=0.
(4) 40 chia seeds were soaked in distilled water in a sealed container (to prevent evaporation) for 8 hours at a temperature of 125° F. (52° C.).
(5) The seeds of step 4 were sprouted for 48 hours. None of the 40 seeds sprouted. Therefore, $n_e$=0.
(6) From step (8) above (the sprouting of chia seeds which had been soaked in 30° C. water for 8 hours), $n_r$ is 29.
(9) D was computed for this product as follows:

$$D=(1/n_r)^*(n_r-n_e)\pm 2/n_t=1.00\pm 0.05=0.95 \text{ to } 1.00.$$

Therefore it can be concluded that a temperature of 125° F. (52° C.) for eight hours is injurious to the sprouting capability of chia seeds whereas a temperature of 104° F. (40° C.) for 8 hours is not injurious to the sprouting capability of chia seeds.

The below table summarizes the results obtained in determining the Thermal Damage Coefficients of various products:

| Soak Water Temperature | No. Out of 40 Sprouting | D |
| --- | --- | --- |
| 70° F. (21 C) | 29 | — |
| 104° F. (40 C) | 29 | 0.00 to 0.05 |
| 125° F. (52 C) | 0 | 0.95 to 1.00 |

The above discussions, definition of D, and results are the basis of Applicant's claim that the products of this invention have a D of less than 0.2.

6.0 Conclusion, Ramifications, and Scope of Invention

Thus the reader will see that the products of this invention have many advantages over the products of the background art.

First, Applicant's invention introduces slightly germinated whole chia seed as the ideal agglutinant for making all kinds of snack products:
a. This agglutinant is nonpasteurized.
b. It does not need to be ground to be easily chewed which not only involves extra time and expense but also exposes the interior nutrients to the deleterious effects of oxidation.
c. It is not subject to the souring action of lactic acid bacteria.
d. It does not contain gluten to which many people are sensitive, yet contributes to holding the products it enters into together so as to make them convenient snack foods.
e. It is rich in nutrition.
f. It does not need to be cooked to be eaten.
g. By quickly firming up the batter in which it is used, it can be thickly spread on dehydrator screens thus facilitating the production of large quantities of the product.
h. After the other ingredients have been thoroughly mixed together in a thin slurry (having low viscosity and being so easily stirred that energy expense is at a minimum), it can then be added, and will then quickly thicken the batter so that the batter can now be spread upon dehydrator screens without leaking through. All of Applicant's chia crackers rely heavily on this most unusual property of chia seed-after all other ingredients have been thoroughly stirred together in a fairly thin easy-to-stir slurry, whole chia seed is added to quickly thicken the batter so that it can now be spread on dehydrator screens rather than on dehydrator solid sheets, thus resulting in large quantities of a very nutritious product with tremendous energy savings.
i. It is at least slightly germinated. This leads to a slight increase in enzymatic activity within the seed and a slight decrease in enzyme inhibitors.

Therefore, the products made with this agglutinant exhibit many desirable qualities:
1. These products hold together well.
2. These products utilize a gluten-free agglutinant which does not sour, needs only to be slightly germinated, and does not need to be milled into flour. The savings in time and added expense are very significant.
3. Those of Applicant's products which are gluten-free are suitable for those who must follow a gluten-free diet. As has been shown above, for the first time not only have unsweetened products been produced with CFA values in excess of 0.6, but with values ranging all the way up to 1.00 (i.e., completely gluten-free).
4. The agglutinant is unsoured. Since the chia seed is not ground into a paste or a flour which would expose the inner portion of the seed to lactic acid bacteria, it does not sour during the dehydration process which produces the final product. Further since chia seed quickly absorbs all available water during the preparation process, this water is kept from those ingredients with a tendency to sour, thus greatly retarding the souring of those ingredients.
5. These products are of excellent and uniform appearance. They are not disfigured by the ugly cracks which ruin the appearance of the background art products.
6. These products can be made very thick. Therefore, there are fewer dehydrator screens to be cleaned for a given weight of end product.
7. The final product does not stick to the screens on which it was dried; hence, no oil is required in product preparation.
8. When a sweet syrup and carob powder are included in the product batter, the resultant product has the organoleptic properties of dried figs.

Second, Applicant's invention introduces an agglutinant obtained from slightly germinated whole chia seed as an ideal agglutinant for making all kinds of snack products:
a. This agglutinant is nonpasteurized.
b. It is not subject to the souring action of lactic acid bacteria.
c. It does not contain gluten to which many people are sensitive, yet contributes to holding the products it enters into together so as to make them convenient snack foods.
d. It does not need to be cooked to be eaten.

Therefore, the products made with this agglutinant exhibit many desirable qualities:
1. These products hold together well.
2. These products utilize a gluten-free agglutinant which does not sour.
3. Those of Applicant's products which are gluten-free are suitable for those who must follow a gluten-free diet.
4. The agglutinant is unsoured. Since the chia seed is not ground into a paste or a flour which would expose the inner portion of the seed to lactic acid bacteria, the agglutinant derived therefrom does not sour during the dehydration process which produces the final product.

Applicant wishes to close this description by pointing out a fact which the reader may not have fully appreciated. The definition of pH given by "Webster's Third New International Dictionary of the English Language Unabridged" (G&C Merriam Co, Springfield, Mass., 1961) is: "the negative logarithm of the effective hydrogen-ion concentration or hydrogen-ion activity in gram equivalents per liter . . . and used for convenience in expressing both acidity and alkalinity usually on a scale of 0 to 14 on which 7 represents the value for pure water at 25° C. or neutrality . . . " Gram equivalent is defined as "the quantity of a chemical element . . . which has a weight in grams equal to the equivalent." A gram equivalent of hydrogen weighs 1 gram. Therefore, let:

$\alpha_H$=effective hydrogen-ion (H$^+$) concentration in grams per liter.

Then pH=$-\log_{10}\alpha_H$, and $\alpha_H=10^{-pH}$ grams/liter=$10^{6-pH}$ mg/kiloliter From the above considerations, the following table can be constructed:

| pH | Mg of H$^+$ per Kiloliter | |
|---|---|---|
| 7.0 | 0.1000 | (neutrality) |
| 6.5 | 0.3162 | |
| 6.4 | 0.3981 | |
| 6.3 | 0.5012 | |
| 6.2 | 0.6310 | |
| 6.1 | 0.7943 | |
| 6.0 | 1.0000 | |
| 5.9 | 1.2589 | |
| 5.8 | 1.5849 | |
| 5.7 | 1.9952 | |
| 5.6 | 2.5119 | |
| 5.5 | 3.1623 | |
| 5.4 | 3.9810 | |
| 5.3 | 5.0119 | |
| 5.2 | 6.3096 | |
| 5.16 | 6.9183 | |
| 5.1 | 7.9433 | |
| 5.0 | 10.0000 | |
| 4.9 | 12.5893 | |

-continued

| pH | Mg of H⁺ per Kiloliter |
|------|------------------------|
| 4.88 | 13.1826 |
| 4.8 | 15.8489 |
| 4.7 | 19.9526 |
| 4.66 | 21.8776 |
| 4.6 | 25.1189 |
| 4.5 | 31.6228 |

NOTE:
gm/liter = $10^6$ mg/kiloliter

The pH of a 6:1 slurry prepared from slightly germinated chia seed is 6.5 which represents 0.3162 mg of $H^+$ per kiloliter. Slightly germinated chia seed does not contain lactic acid. Therefore this value of 0.3162 mg of $H^+$ per kiloliter is due solely to the other components of the slightly germinated chia seed. It can therefore be said that 0.3162 mg of $H^+$ per kiloliter is the value expected for a 6:1 slurry of slightly germinated chia seed. It is therefore the value expected for a 6:1 slurry prepared from a slightly germinated chia seed product which does not contain any lactic acid. So we will call this value of 0.3162 mg of $H^+$ per kiloliter the value which would be obtained if a completely unsoured slightly germinated chia seed product were made. Then any difference between this value and the value obtained for a soured product would be due to the lactic acid content of the soured product.

NOTE: As discussed in §4.1 of this specification, the pH value of a product containing chia seed is defined as the pH value of a 6:1 slurry prepared from that product. Similarly, the pH value of a batter from which the product is to be made is defined as the pH value of a slurry consisting of six parts water and 1 part the solids of that batter (i.e., enough water is to be added to the batter so that the water inherent in the batter plus added water would be six times the weight of the solids in the batter).

In preparing the Plain Chia Crackers of Example 1, a batter was prepared consisting of whole chia seed and water. This batter exhibited a pH value of 6.5 which corresponds to 0.3162 mg of $H^+$ per kiloliter. Since this batter does not contain any lactic acid (no souring having yet taken place), the 0.3162 mg of $H^+$ per kiloliter is solely due to the natural properties of whole chia seed. After dehydration of this batter, the resultant product exhibited a pH value of 6.5 which again corresponds to 0.3162 mg of $H^+$ per kiloliter. Therefore no lactic acid whatsoever formed in the product as it dried.

Plain Chia Crackers were then prepared from a batter consisting of ground chia seed and water instead of whole chia seed and water. This batter exhibited a pH value of 6.5 which corresponds to 0.3162 mg of $H^+$ ions per kiloliter. Since this batter does not contain any lactic acid (no souring having yet taken place), the 0.3162 mg of $H^+$ per kiloliter is solely due to the natural properties of the as-yet unsoured ground chia seed. After dehydration of the batter, the resultant product exhibited a pH of 5.16. From the above table, it can be seen that this pH value corresponds to 6.9183 mg of $H^+$ per kiloliter. Therefore the lactic acid which formed in these crackers made from ground chia seed and water as they dried has contributed 6.9183−0.3162=6.6021 mg of $H^+$ per kiloliter which, being excessive, causes these crackers to taste sour. From 6.6021 mg per kiloliter (for crackers made from ground chia seed and water) to 0.0 mg per kiloliter (for crackers made from whole chia seed and water) is a decrease in acidity of 100 percent. In other words, a batter of ground chia seed and water sours considerably during the long dehydration process which results in the final product. And that is why products prepared with whole chia seed taste so good, and products prepared with ground chia seed taste somewhat sour and bitter.

The rice crackers made according to the method of Baker (Example 4 of §6.7), the closest known background art, exhibited a pH value of 4.66 ($pH_f$). From the above table, it can be seen that this pH value corresponds to 21.8776 mg of $H^+$ per kiloliter. The pH of the batter from which these crackers were to be made is estimated to be 6.0 ($pH_o$). From the above table, this pH corresponds to 1.0 mg of $H^+$ per kiloliter. Since the batter from which these crackers were to be made does not contain any lactic acid (no souring having yet taken place), the 1.0 mg of $H^+$ per kiloliter is solely due to the natural properties of this batter. Therefore the lactic acid which formed in crackers made by the method of Baker as they dried has contributed 21.8776−1.0=20.8776 mg of $H^+$ per kiloliter which, being excessive, causes these crackers to taste sour. On the other hand, the rice crackers prepared by the method of Applicant, exhibited a pH of 5.0. From the above table, it can be seen that this pH value corresponds to 10.0 mg of $H^+$ per kiloliter. The pH of the batter from which Applicant's crackers were to be made is estimated to be 6.0 ($pH_o$). From the above table, this pH corresponds to 1.0 mg of $H^+$ per kiloliter. Since the batter from which Applicant's crackers were made does not contain any lactic acid (no souring having yet taken place), the 1.0 mg of $H^+$ per kiloliter is solely due to the natural properties of this batter. Therefore the lactic acid which formed in Applicant's product as it dried is responsible for the 10.0−1.0=9.0 mg of $H^+$ per kiloliter of the final product. From 20.8776 mg per kiloliter (due to lactic acid in Baker's crackers) to 9.0 mg per kiloliter (due to lactic acid in Applicant's crackers) is a decrease in acidity due to lactic acid souring of more than 56 percent. And that is why the products prepared with whole chia by the methods of Applicant's invention taste so good, and products prepared from ground chia by the closest background art taste somewhat sour and bitter.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents. While the present invention has been described in terms of preferred embodiments and generally associated methods, the inventor contemplates that alterations and permutations of the preferred embodiments and method will become apparent to those skilled in the art upon a reading of the specification and a study of the drawings. For example, this invention can also be used to make cookies, pretzels, crackers, and biscuits. This invention can be used to agglutinate apples, celery, dates—in short any fruit, vegetable, seed, or sprout, which is first divided into pieces not larger than about one inch on each side. For a further example, although Applicant's preferred method utilizes a dehydrator to reduce the water activity of these product, other equipment and methods could also be used alone or in combination with one another, such as spray drying, utilization of reverse osmosis, vacuum chamber drying, dehumidification equipment, ultrafiltration equipment, sun drying, foam-mat drying, tower drying at low temperatures in dehumidified air, and using a high-speed fan at room temperature.

Accordingly, the above description of preferred exemplary embodiments does not define or constrain the present invention. Rather, the issued claims variously define the present invention. Each variation of the present invention is limited only by the recited limitations of its respective claim, and equivalents thereof, without limitation by other terms not present in the claim. Further, aspects of the present invention are particularly pointed out below using terminology that the inventor regards as having its broadest reasonable interpretation; the more specific interpretations of 35 U.S.C. section 112(6) are only intended in those instances where the term "means" is actually recited.

I claim:

1. A method of agglutinating a raw food selected from the group consisting of fruits, vegetables, sprouted grains, unsprouted grains, sweet syrups, honey, and vegetable powders, said method being carried out in a preparation area with a predetermined relative humidity, which method comprises:
   (a) dividing the food into pieces not larger than about ½ inch on each side;
   (b) mixing the food with an amount of a liquid comprising water, said liquid having a temperature of less than 48 C., said liquid being sufficient to form a mixture;.
   (c) mixing the mixture of step (b) with an amount of whole chia seeds, wherein the amount of whole chia seeds is at least 1.5*Majority Agglutinant Amount, and which amount of whole chia seeds is sufficient to agglutinate the mixture, wherein the whole chia seeds which are mixed with the mixture are substantially evenly dispersed throughout the mixture; and
   (d) reducing the water activity of the agglutinated mixture of step (c) below 0.80 to obtain an agglutinated food.

2. The method of claim 1, wherein the water activity of the agglutinated mixture is reduced by dehydration.

3. The method of claim 2, wherein the method further comprises spreading the agglutinated mixture onto a double-access drying surface.

4. The method of claim 3, wherein the agglutinated mixture is dehydrated until its water activity is reduced to less than 0.60, whereby spoilage by microorganisms is inhibited.

5. The method of claim 3, wherein the liquid further comprises a sweet syrup, whereby additional strength and flexibility is imparted to the agglutinated food.

6. The method of claim 3, wherein the liquid further comprises carob powder, whereby the chia seed in the agglutinated food has a taste which is substantially masked.

7. The method of claim 2, further comprising reducing the relative humidity of the preparation area to less than 70 percent.

8. The method of claim 7, wherein the relative humidity of the preparation area is reduced to less than 60 percent, and the water activity of the mixture is reduced to less than 0.60.

9. The method of claim 1, wherein the liquid further comprises a sweet syrup whereby additional strength and flexibility is imparted to the agglutinated food.

10. The method of claim 1, further comprising allowing the chia seeds in the agglutinated mixture to absorb liquid from the agglutinated mixture.

11. The method of claim 1, wherein the liquid further comprises carob powder, whereby the chia seed in the agglutinated food has a taste which is substantially masked.

12. The method of claim 1, wherein the agglutinated mixture of step (c) is dehydrated until its water activity is reduced to less than 0.60, whereby spoilage by microorganisms is inhibited.

13. A method of making a raw food product comprising whole chia seed, said food product being absent of sufficient gluten-containing ingredients to agglutinate the product, said method comprising the steps of:
   (a) mixing whole chia seed with water to form a mixture;
   (b) spreading this mixture on a double-access drying surface;
   (c) slicing the dehydrating mixture after a specified period of time; and
   (d) dehydrating the sliced mixture at a predetermined temperature until its water activity has been reduced below 0.60.

14. The method of claim 13 further comprising the step of reducing the relative humidity of the preparation area in which the product will be made to less than 40%.

15. The method of claim 13 further comprising the step of allowing the whole chia seed in this mixture to absorb water from the mixture, whereby said mixture thickens.

16. The method of claim 13 wherein the predetermined temperature is less than 40° C.

17. The method of claim 13 wherein the end of the specified period of time is when the batter on the double-access drying surface has set until it is firm enough to be sliced and lifted off said double-access drying surface without breaking.

18. The method of claim 13 further comprising the step of rehydrating the sliced mixture until its water activity is 0.65.

19. The food product made by the method of claim 1.

20. A raw food product comprising raw whole chia seed, said chia seed having a taste and mucilaginous properties, said raw food product being absent of sufficient gluten-containing ingredients to agglutinate the product, wherein:
   (a) the raw food product has a water activity between 0.60 and 0.70, whereby the raw food product is easy to chew and spoilage by microorganisms is substantially inhibited;
   (b) the mucilaginous properties of the whole chia seed cause the raw food product to cohere.

* * * * *